United States Patent
Sugishita

(10) Patent No.: US 11,498,605 B2
(45) Date of Patent: Nov. 15, 2022

(54) OUTER COLUMN AND STEERING DEVICE

(71) Applicant: NSK Ltd., Tokyo (JP)

(72) Inventor: Suguru Sugishita, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 17/293,997

(22) PCT Filed: Nov. 13, 2019

(86) PCT No.: PCT/JP2019/044502
§ 371 (c)(1),
(2) Date: May 14, 2021

(87) PCT Pub. No.: WO2020/100931
PCT Pub. Date: May 22, 2020

(65) Prior Publication Data
US 2022/0009542 A1 Jan. 13, 2022

(30) Foreign Application Priority Data
Nov. 15, 2018 (JP) .............................. JP2018-214408

(51) Int. Cl.
*B62D 1/184* (2006.01)
*B62D 1/189* (2006.01)

(52) U.S. Cl.
CPC ............. *B62D 1/184* (2013.01); *B62D 1/189* (2013.01)

(58) Field of Classification Search
CPC ................................ B62D 1/184; B62D 1/189
See application file for complete search history.

(56) References Cited

U.S. PATENT DOCUMENTS

| | | | |
|---|---|---|---|
| 10,059,363 B2* | 8/2018 | Sugishita | B62D 1/184 |
| 10,093,340 B2* | 10/2018 | Sugishita | B62D 1/185 |
| 2016/0214636 A1 | 7/2016 | Watanabe | |
| 2018/0022375 A1 | 1/2018 | Sugishita | |
| 2018/0029627 A1 | 2/2018 | Sugishita et al. | |

FOREIGN PATENT DOCUMENTS

| | | |
|---|---|---|
| EP | 3 611 075 A1 | 2/2020 |
| JP | 2017-197178 A | 11/2017 |
| JP | 2018083613 A * | 5/2018 |
| WO | WO 2016/186147 A1 | 11/2016 |
| WO | WO 2016/186149 A1 | 11/2016 |

OTHER PUBLICATIONS

International Search Report (PCT/ISA/210) issued in PCT Application No. PCT/JP2019/044502 dated Feb. 4, 2020 with English translation (four (4) pages).
Japanese-language Written Opinion (PCT/ISA/237) issued in PCT Application No. PCT/JP2019/044502 dated Feb. 4, 2020 (three (3) pages).

* cited by examiner

*Primary Examiner* — Nicole T Verley
(74) *Attorney, Agent, or Firm* — Crowell & Moring LLP

(57) ABSTRACT

The front-side portion of an outer column includes a substantially cylindrical column main body portion having a pair of clamp portions and externally fitting with an inner column, and a reinforcing bridge portion that is integrally provided below the column main body portion. The front-side connecting portion of the reinforcing bridge portion includes a front-side inclined portion that inclines in a direction toward the front side going toward the upper side, and a rear-side connecting portion inclines in a direction toward the rear side going toward the upper side.

3 Claims, 23 Drawing Sheets

OUTER COLUMN AND STEERING DEVICE

TECHNICAL FIELD

The present invention relates to a steering device for applying a steering angle to steered wheels of an automobile or the like, and an outer column that together with an inner column constitutes a steering column.

BACKGROUND ART

A steering device installed in a vehicle such as an automobile or the like transmits the movement of a steering wheel operated by a driver to a steering gear unit via a steering shaft, and applies a steering angle to left and right steered wheels. The steering device may be provided with a position adjusting mechanism capable of adjusting the position of the steering wheel according to the physique and the driving posture of the driver.

FIGS. 19 to 21 illustrate an example of a steering device that includes a steering wheel position adjusting mechanism as disclosed in WO2016/186149. In the steering device 1, a steering shaft 2 to which a steering wheel (not illustrated) is fixed at a rear-end portion thereof is rotatably supported inside a tubular steering column 3 via a plurality of rolling bearings. Note that unless specified otherwise, the front-rear direction, the width direction (horizontal direction), and the vertical direction refer to the front-rear direction, the width direction (horizontal direction), and the vertical direction of the vehicle in a state in which the steering device is installed.

A front-side portion of the steering column 3 is supported by a lower bracket 4, and an intermediate portion in the front-rear direction of the steering column 3 is supported by an upper bracket 5. The lower bracket 4 and the upper bracket 5 are supported by the vehicle body 6. An electric assist device 7 for reducing the force required for operating the steering wheel is provided on the front-side portion of the steering column 3.

In order to enable the adjustment of the front-rear position of the steering wheel, the steering column 3 is configured so that, by fitting the front-side portion of the outer column 9 that is arranged behind with the rear-side portion of the inner column 8 that is arranged in the front so as to enable relative displacement in the axial direction, the overall length may be expanded or contracted. The outer column 9 is supported so as to be able to move in the front-rear direction with respect to the upper bracket 5. The steering shaft 2 is configured by combining the inner shaft 10 and the outer shaft 11 by spline engagement or the like so that torque may be transmitted and the entire length may be expanded or contracted.

In order to enable adjustment of the vertical position of the steering wheel, the steering column 3 is supported by the lower bracket 4 so as to be able to pivotally displace about a tilt shaft 12 arranged in the width direction, and the outer column 9 is supported by the upper bracket 5 so as to be able to move in the vertical direction.

The upper bracket 5 includes a pair of mounting plate portions 31 that are supported so as to be able to detach toward the front with respect to the vehicle body 6, and a pair of support plate portions 21 that are arranged on both sides in the width direction of a sandwiched portion 13 of the outer column 9. The pair of support plate portions 21 includes elongated tilt adjustment holes 32 that extend in the vertical direction.

In the steering device 1, it is possible to maintain both the strength of the outer column 9 and the holding force of the inner column 8. More specifically, the outer column 9 includes the sandwiched portion 13 arranged in the front-half portion and a tubular portion 14 arranged in the rear-half portion. A substantially cylindrical column main body portion 15 for externally fitting the inner column 8 is provided on an upper-side portion of the sandwiched portion 13, and a substantially box-shaped reinforcing bridge portion 16 is integrally provided with the column main body 15 on the lower-side portion of the sandwiched portion 13.

A front-rear direction slit 17 that extends in the front-rear direction is provided on a lower surface of the column main body portion 15. The front-side portion and the rear-side portion of the lower-half portion of the column main body portion 15 are provided with a front-side circumferential-direction slit 18 and a rear-side circumferential-direction slit 19 so that each crosses the front-rear direction slit 17 in the circumferential direction. On each of both sides in the width direction of the column main body portion 15, each clamp portion forming a pair of clamp portions 20 is provided in a portion that is surrounded on three sides by the front-rear direction slit 17, the front-side circumferential-direction slit 18, and the rear-side circumferential-direction slit 19. The lower-end portions of the outer-side surfaces in the width direction of the pair of clamp portions 20 are provided with first tightening surfaces 22 that receive a tightening force from the inner-side surfaces in the width direction of the pair of support plate portions 21 of the upper bracket 5.

The reinforcing bridge portion 16 is arranged so as to cover the pair of clamp portions 20 via a substantially U-shaped gap 23 as viewed from the width direction, and includes a bottom-plate portion 24, a front-side connecting portion 25, and a rear-side connecting portion 26. The bottom-plate portion 24 extends in the front-rear direction and the width direction, and is arranged below the pair of clamp portions 20 via an elongated telescopic adjustment hole 27 that extends in the front-rear direction and constitutes the lower side of the substantially U-shaped gap 23. The lower-side portions of both side surfaces in the width direction of the bottom-plate portion 24 include second tightening surfaces 28 that receive a tightening force from the inner-side surfaces in the width direction of the pair of support plate portions 21. The front-side connecting portion 25 connects the front-end portion of the bottom-plate portion 24 and a portion of the lower surface of the column main body portion 15 that is adjacent to the front side of the front-side circumferential-direction slit 18. The rear-side connecting portion 26 connects the rear-end portion of the bottom-plate portion 24 and a portion of the lower surface of the column main body portion 15 that is adjacent to the rear side of the rear-side circumferential-direction slit 19.

Ridge portions 29 projecting toward the outside in the width direction are provided at portions of both side surfaces in the width direction of the column main body portion 15 that overlap with the center axis of the outer column 9 in the vertical direction. The tip-end surfaces of the ridge portions 29 constitute third tightening surfaces 30 that receive a tightening force from the inner-side surfaces in the width direction of the pair of support plate portions 21.

In the steering device 1, an adjustment lever 34 that is attached to the end portion of an adjustment rod 33 that is inserted in the width direction through the elongated telescopic adjustment hole 27 and the elongated tilt adjustment holes 32 is operated to increase or reduce the dimension in the axial direction of a cam device 35; and by doing so, the gap between the inner-side surfaces in the width direction of the pair of support plate portions 21 may be increased or reduced. With this configuration, the force with which the inner-side surfaces in the width direction of the pair of support plate portions 21 press the first tightening surfaces 22, the second tightening surfaces 28, and the third tightening surfaces 30 in the width direction may be adjusted. In a clamp state where the gap between the inner-side surfaces in the width direction of the pair of support plate portions 21 is shortened, the inner sides in the width direction of the pair of clamp portions 20 are elastically deformed, and the outer-circumferential surface of the inner column 8 is held from both side in the width direction. Therefore, position adjustment of the steering wheel becomes impossible. In an unclamp state where the gap between the inner-side surfaces in the width direction of the pair of support plate portions 21 is widened, the pair of clamp portions 20 are elastically restored, and the force holding the outer-circumferential surface of the inner column 8 is decreased. Therefore, adjustment of the front-rear position and the vertical position of the steering wheel becomes possible within a range in which the adjustment rod 33 is able to move inside the elongated telescopic adjustment hole 27 and the elongated tilt adjustment holes 32.

The second tightening surfaces 28 and the third tightening surfaces 30 are arranged in portions where the rigidity in the width direction is higher than the pair of clamp portions 20 in which the first tightening surface 22 are arranged. Therefore, when the gap between the inner-side surfaces in the width direction of the pair of support plate portions 21 is reduced, the pair of clamp portions 20 may be bent a large amount in the width direction. For example, in a structure where the steering device 1 includes a steering lock device for preventing vehicle theft, in a state in which the steering lock device is activated, and in a case where torque is applied to the outer column 9 by operating the steering wheel with a large force, the torque is transmitted to the support plate portions 21 from the outer column 9 via the second tightening surfaces 28 and the third tightening surfaces 30. With such a structure, it is possible to maintain both the strength of the outer column 9 and the holding force of the inner column 8.

CITATION LIST

Patent Literature

Patent Literature 1: WO 2016/186149

SUMMARY OF THE INVENTION

Technical Problem

In a steering device 1 having a conventional structure, there is still room for improvement from the aspect of improving the rigidity of the outer column 9 and suppressing the inclination of the outer column 9 with respect to the inner column 8. For example, when a secondary collision occurs in which the driver's body collides with the steering wheel, a push-up load is applied to the steering wheel, and as illustrated by the arrow X in FIG. 20, a force is applied to the outer column 9 in a direction that moves the outer column 9 upward. At this time, the pair of clamp portions 20 restrains the outer-circumferential surface of the inner column 8 and does not displace with respect to the inner column 8, and thus the outer column 9 tends to rotate or tilt around the pair of clamp portions 20 as fulcrums. The reinforcing bridge portion 16 is arranged so as to cover the pair of clamp portions 20, and becomes a resistance against tilting of the outer column 9; however, a gap 23 exists between the reinforcing bridge portion 16 and the column main body portion 15, or in other words, the sandwiched portion 13 has an opening portion. Therefore, it is difficult to sufficiently suppress the tilting of the outer column 9. This will be described with reference to FIG. 22.

In FIG. 22, the reinforcing bridge portion viewed from the width direction is represented by a line diagram. The deformed state of the reinforcing bridge portion is exaggeratedly expressed. As illustrated by the broken line in FIG. 22, in a state before an upward force is applied to the steering wheel, in the reinforcing bridge portion 16, the front-side connecting portion 25 and the rear-side connecting portion 26 are arranged substantially in parallel, and the reinforcing bridge portion 16 as a whole is configured in a substantially U shape as viewed from the width direction, or in other words, a rectangular shape having no upper side. When an upward force is applied to the steering wheel and a force indicated by the arrows in FIG. 22 is applied to the reinforcing bridge portion 16, the reinforcing bridge portion 16 is deformed from the shape illustrated by the broken line to the shape illustrated by the solid line. In other words, the rear-side connecting portion 26 cannot withstand a force directed toward the rear and the upper side, and is deformed so as to be curved to the rear side. Therefore, the included angle between the bottom-plate portion 24 and the rear-side connecting portion 26 becomes small. The front-side connecting portion 25 cannot withstand a force toward the rear side and the lower side, and is deformed so as to be curved to the rear side. Therefore, the included angle between the bottom-plate portion 24 and the front-side connecting portion 25 becomes large. Therefore, the reinforcing bridge portion 16 is greatly deformed so that it becomes easy for the groove width of the front-side circumferential-direction slit 18 to become narrow, the groove width of the rear-side circumferential-direction slit 19 to become wide, and the inclination of the outer column 9 with respect to the inner column 8 to become large.

The inclination of the outer column becomes prominent in a case as illustrated in FIG. 23A where the steering wheel is displaced to the rear side as much as possible, and the position in the front-rear direction of the rear-end portion of the inner column 8 and the rear-side circumferential-direction slit 19 coincide with each other. This is because in a case as illustrated in FIG. 23B where the rear-end portion of the inner column 8 is located further on the rear side than the rear-side circumferential-direction slit 19, the fitting length of the inner column 8 and the outer column 9 becomes long, and tilting of the outer column 9 with respect to the inner column 8 may be prevented by interference between the rear-end portion of the inner column 8 and the inner-circumferential surface of the tubular portion 14 of the outer column 9; whereas, in a case where the position in the front-rear direction of the rear-end portion of the inner column 8 and the rear-side circumferential-direction slit 19 coincide with each other, the rear-end portion of the inner column 8 and the inner-circumferential surface of the tubular portion 14 of the outer column 9 cannot be made to interfere with each other.

The inclination of the outer column tends to easily occur due to a decrease in the rigidity of the bottom-plate portion in a case where the plate thickness of the bottom-plate portion of the reinforcing bridge portion is reduced in order to make it possible to reduce the size of the outer column and the upper bracket.

In view of the circumstances described above, an object of the present invention is to achieve a structure of an outer column capable of improving the rigidity of the outer column and suppressing the inclination of the outer column with respect to the inner column.

Solution to Problem

An outer column of the present invention is arranged behind an inner column, and a has a front-side portion for externally fitting with a rear-side portion of the inner column to allow relative displacement in an axial direction, and an elongated telescopic adjustment hole that extends in a front-rear direction.

The outer column of the present invention includes a column main body portion having a substantially cylindrical shape and arranged on the front-side portion, and a reinforcing bridge portion integrally arranged below the column main body portion.

The column main body portion has a pair of clamp portions arranged on both sides in a width direction, that, by elastically deforming in the width direction, is capable of holding the inner column from both sides in the width direction.

The reinforcing bridge portion is arranged so as to cover the pair of clamp portions via a substantially U-shaped gap as viewed from the width direction, and has a bottom-plate portion, a front-side connecting portion, and a rear-side connecting portion.

The bottom-plate portion extends in the front-rear direction and the width direction, and is arranged below the pair of clamp portions via the elongated telescopic adjustment hole forming a lower side of the substantially U-shaped gap.

The front-side connecting portion connects a front-end portion of the bottom-plate portion and a portion of a lower surface of the column main body portion that is arranged further on a front side than the pair of clamp portions.

The rear-side connecting portion connects a rear-end portion of the bottom-plate portion and a portion of the lower surface of the column main body portion that is arranged further on a rear side than the pair of clamp portions.

Particularly, in the outer column of the present invention, the front-side connecting portion includes a front-side inclined portion that is inclined in a direction toward the front side going toward an upper side. The rear-side connecting portion includes a rear-side inclined portion that is inclined in a direction toward the rear side going toward the upper side.

The bottom-plate portion of the outer column of the present invention may include a reinforcing rib. The reinforcing rib is arranged so as to extend in the front-rear direction on a lower surface of the bottom-plate portion and be continuous in a range from the lower surface of the bottom-plate portion to a front surface of the front-side connecting portion.

In the outer column of the present invention, the reinforcing rib may include a first rib extending in the front-rear direction on the lower surface of the bottom-plate portion and having a front-end portion that projects further toward the front side than the front-end portion of the bottom-plate portion, and a second rib extending toward the upper side from a front-end portion of the first rib and being continuous to the front surface of the front-side connecting portion.

In this case, the column main body portion may have a front-rear direction slit extending in the front-rear direction on the lower surface of the column body, and a front-side circumferential-direction slit and a rear-side circumferential-direction slit in a front-side portion and a rear-side portion of a lower-half portion of the column main body portion extending in a circumferential direction so as to respectively cross the front-rear direction slit; each of the clamp portions of the pair of clamp portions may include a portion on each of both sides in the width direction surrounded on three sides by the front-rear direction slit, the front-side circumferential-direction slit, and the rear-side circumferential-direction slit; and the front-end portion of the first rib may cover a front-end portion of the front-rear direction slit from below.

The steering device of the present invention includes a steering column, a support bracket, and an adjustment rod.

The steering column includes an inner column, and an outer column arranged behind the inner column and having a front-side portion for externally fitting with a rear-side portion of the inner column to allow relative displacement in an axial direction, and an elongated telescopic adjustment hole that extends in a front-rear direction.

The support bracket is capable of being supported by a vehicle body and includes a pair of support plate portions arranged on both sides in a width direction of the outer column and having bracket side through holes.

The adjustment rod is inserted in the width direction through the elongated telescopic adjustment hole and the bracket side through holes.

In particular, in the steering device of the present invention, the outer column is composed of the outer column of the present invention.

The steering device of the preset invention may include a tilt mechanism that enables adjustment of the vertical position of a steering wheel. In this case, the bracket-side through hole is composed of an elongated tilt adjustment hole that extends in the vertical direction. In a case where the steering device of the present invention does not include a tilt mechanism, the bracket-side through hole is composed of a simple circular hole.

Effect of Invention

The present invention provides an outer column having a structure that improves the rigidity thereof and that is capable of suppressing inclination with respect to an inner column, and a steering device that includes the outer column.

BRIEF DESCRIPTION OF THE DRAWINGS

FIG. 23A illustrates a case where a rear-end portion of the inner column and a rear-side circumferential-direction slit are aligned in the front-rear direction; and FIG. 23B illustrates a case where the rear-end portion of the inner column is located further on the rear side than the rear-side circumferential-direction slit.

DESCRIPTION OF EMBODIMENTS

First Example

An example of an embodiment of the present invention will be described using FIGS. 1 to 18. The steering device of this example includes a steering column 3a, an upper bracket 5a corresponding to a support bracket, and an adjustment rod 33a. The steering shaft 2a is rotatably supported inside a substantially cylindrical steering column 3a via a plurality of rolling bearings (not illustrated). The steering wheel 36 is fixed to the rear-end portion of the steering shaft 2a that protrudes further toward the rear side than the rear-end opening of the steering column 3a.

Figure 19:
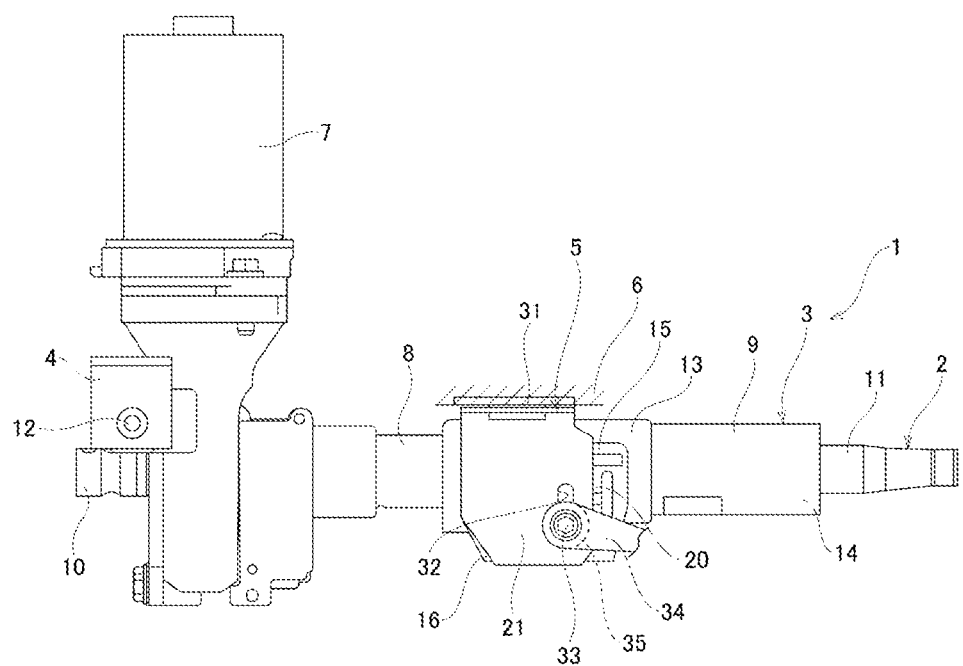
FIG. 19 is a side view illustrating a steering device having a conventional structure.
Figure 20:
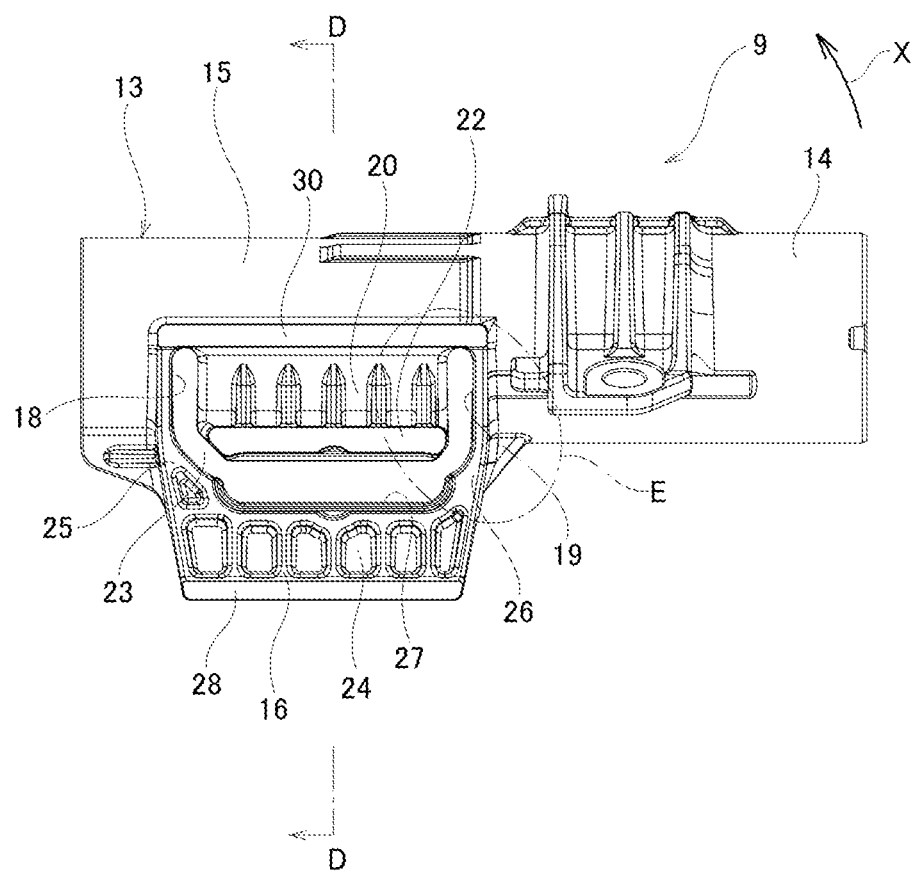
FIG. 20 is a side view of an outer column of the steering device having a conventional structure.

A gear housing 37 of an electric assist device 7a is arranged at the front-end portion of the steering column 3a. The gear housing 37 is supported by a lower bracket 4a fixed to a vehicle body 6 (see FIG. 19) so as to be able to pivotally displace around a tilt shaft 12a that is arranged in the width direction. Therefore, the steering column 3a is able to pivotally displace about the tilt shaft 12a. An electric motor (not illustrated) is supported by the gear housing 37. The output torque of the electric motor is applied to the steering shaft 2a via a reduction mechanism arranged inside the gear housing 37. As a result, the force required for operating the steering wheel 36 may be reduced.

The steering device 1a includes a tilt mechanism for adjusting the vertical position of the steering wheel 36 and a telescopic mechanism for adjusting the front-rear position according to the physique and driving posture of the driver.

In order to form the telescopic mechanism, the steering column 3a includes an inner column 8a arranged in front (lower side) and an outer column 9a arranged behind the inner column 8a. The inner column 8a has a substantially cylindrical shape. The outer column 9a includes a substantially cylindrical front-side portion for externally fitting to the rear-side portion of the inner column 8a. By externally fitting the front-side portion of the outer column 9a to the rear-side portion of the inner column 8a so as to be able to relatively displace in the axial direction, the steering column 3a is configured such that the overall length may be expanded or contracted. The outer column 9a is supported by the upper bracket 5a so as to be able to move in the front-rear direction. The steering shaft 2a is configured by combining an inner shaft 10a and an outer shaft 11a by a spline engagement or the like so that torque may be transmitted and the entire length may be expanded or contracted.

In order to form the tilt mechanism, the steering column 3a is supported by the vehicle body 6 so as to be able to pivotally displace around the tilt shaft 12a arranged in the width direction. The outer column 9a is supported by the upper bracket 5a so as to be able to move in the vertical direction.

As illustrated in FIG. 7 to FIG. 16, the outer column 9a includes a sandwiched portion 13a made of a light alloy such as an aluminum alloy, magnesium alloy or the like and arranged on the front-side portion (the front-half portion in this example), and a tubular portion 14a made of an iron-based alloy such as carbon steel or the like and arranged on the rear-side portion (the rear-half portion in this example). and is configured by connecting (casting) the sandwiched portion 13a and the tubular portion 14a in the axial direction. The sandwiched portion 13a is supported by the upper bracket 5a so as to be able to move in the front-rear direction and the vertical direction. A substantially cylindrical column main body portion 15a for externally fitting to the inner column 8a is arranged on the upper-side portion of the sandwiched portion 13a, and a substantially box-shaped reinforcing bridge portion 16a that is integrally provided with the column main body portion 15a is arranged on the lower-side portion of the sandwiched portion 13a. Note that the sandwiched portion and the tubular portion may be integrally provided.

The intermediate portion in the front-rear direction of the column main body portion 15a has a thin-walled portion 39 around the entire circumference having a smaller outer-diameter dimension than the portions adjacent to both sides in the front-rear direction. On both sides in the front-rear direction of the thin-walled portion 39, there are thick-walled portions 40a, 40b around the entire circumference having a larger outer-diameter dimension than the thin-walled portion 39. The inner-diameter dimensions of the thin-walled portion 39 and the thick-walled portions 40a, 40b are the same as each other. The dimensions in the front-rear direction of the thin-walled portion 39 and the thick-walled portions 40a, 40b are also substantially the same as each other. The central portion in the width direction of the upper surface of the column main body portion 15a is provided with an upper-side rib 41 that extends in the front-rear direction so as to connect the thick-walled portions 40a, 40b that are separated in the front-rear direction.

Figure 10:
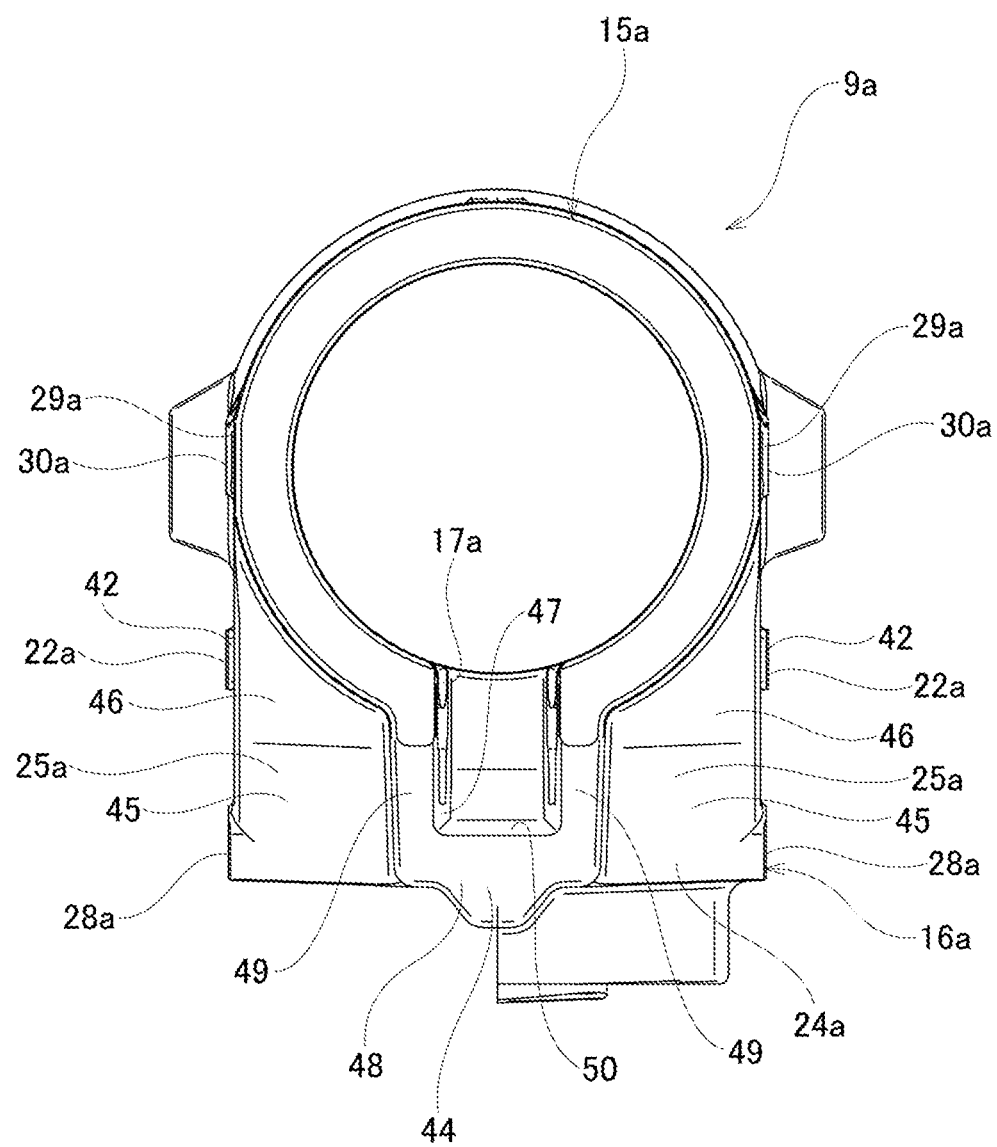
FIG. 10 is an end view as viewed from the front side of the outer column of this example.
Figure 11:
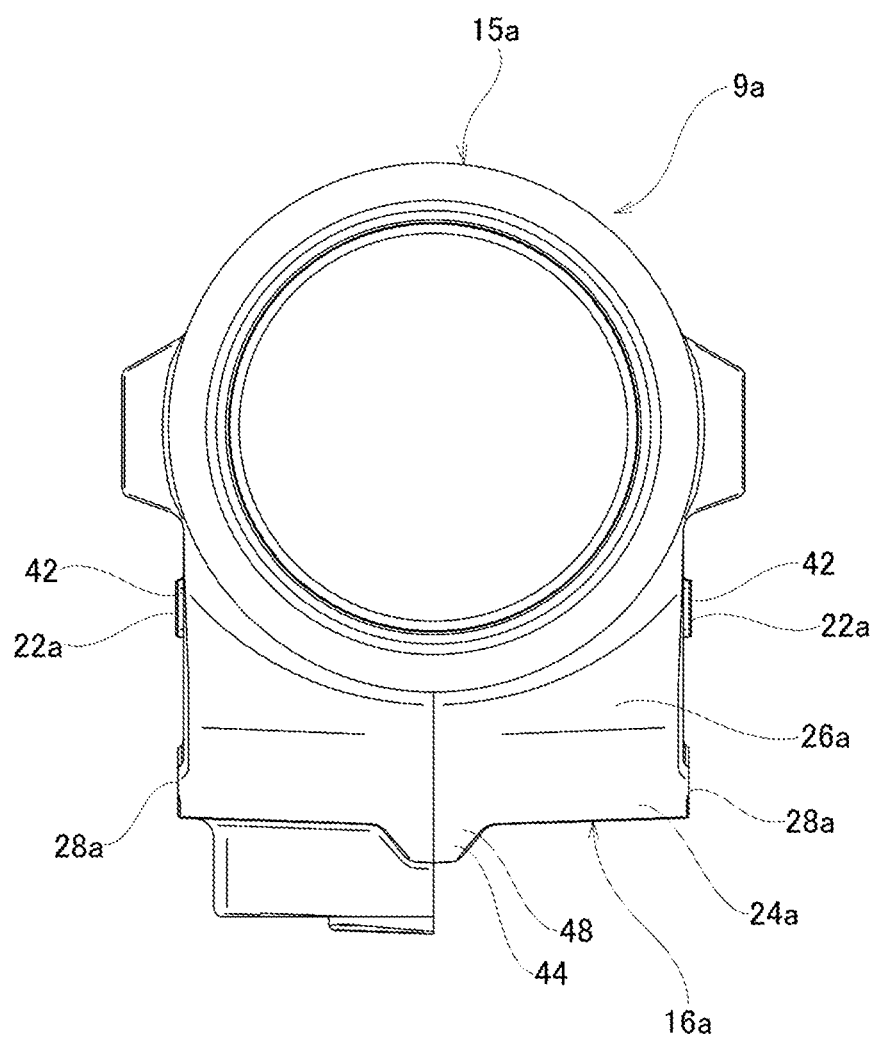
FIG. 11 is an end view as viewed from the rear side of the outer column of this example.
Figure 12:
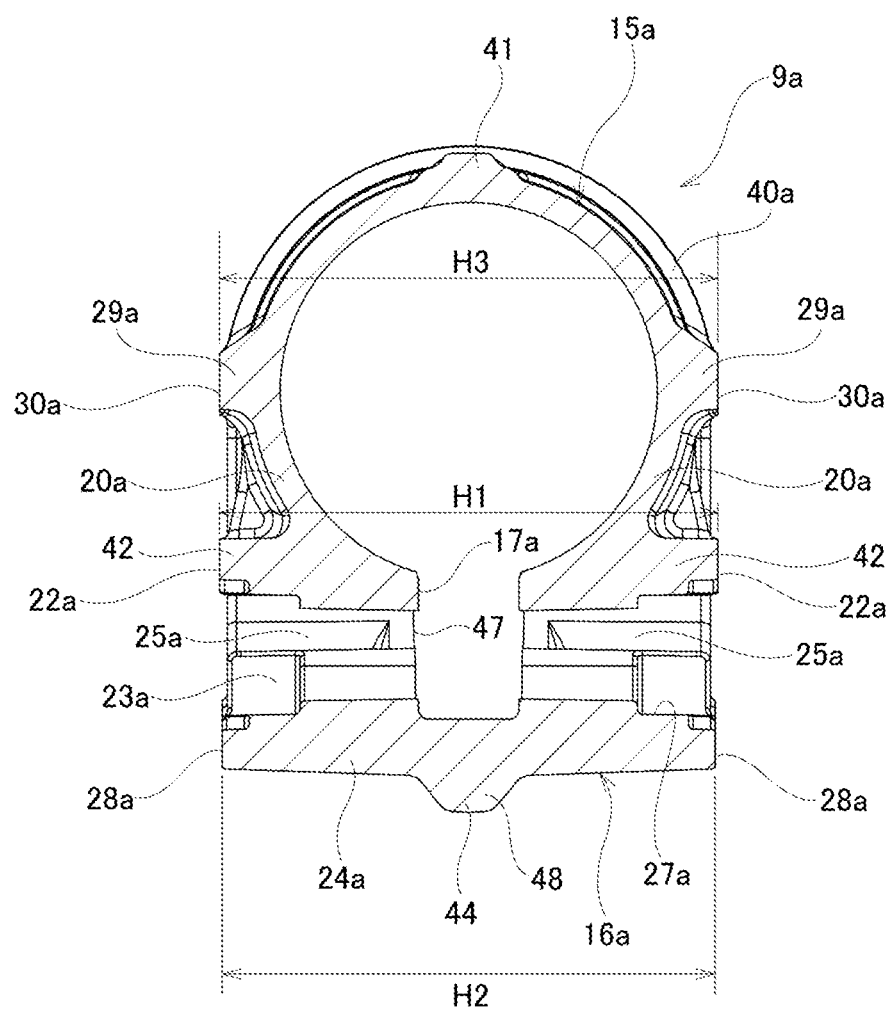
FIG. 12 is a cross-sectional view taken along section line B-B in FIG. 7.
Figure 13:
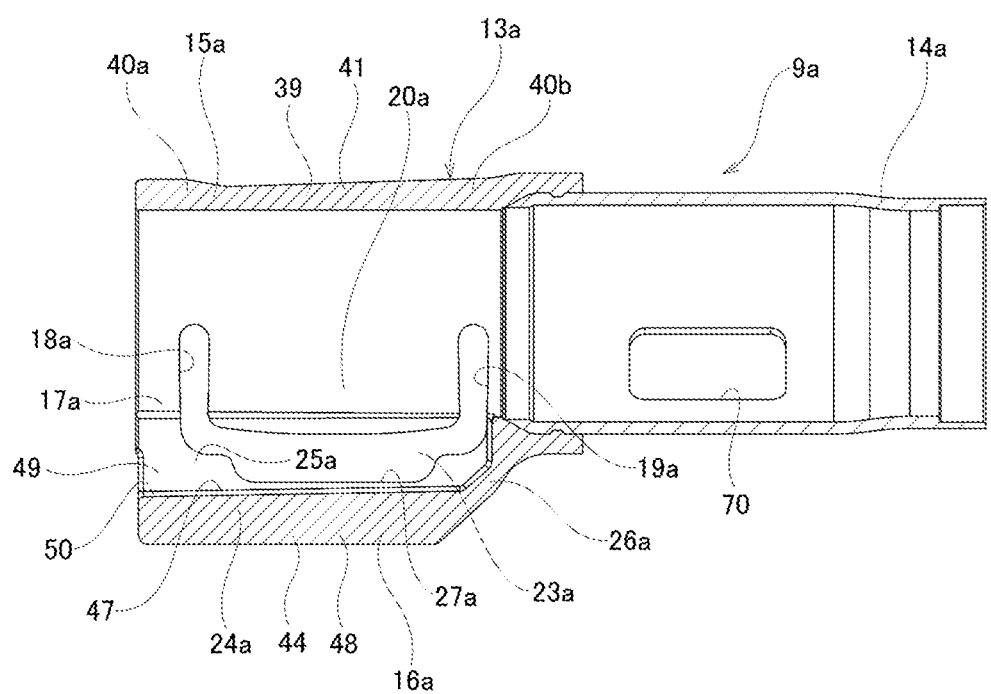
FIG. 13 is a cross-sectional view taken along section line C-C in FIG. 8.
Figure 14:
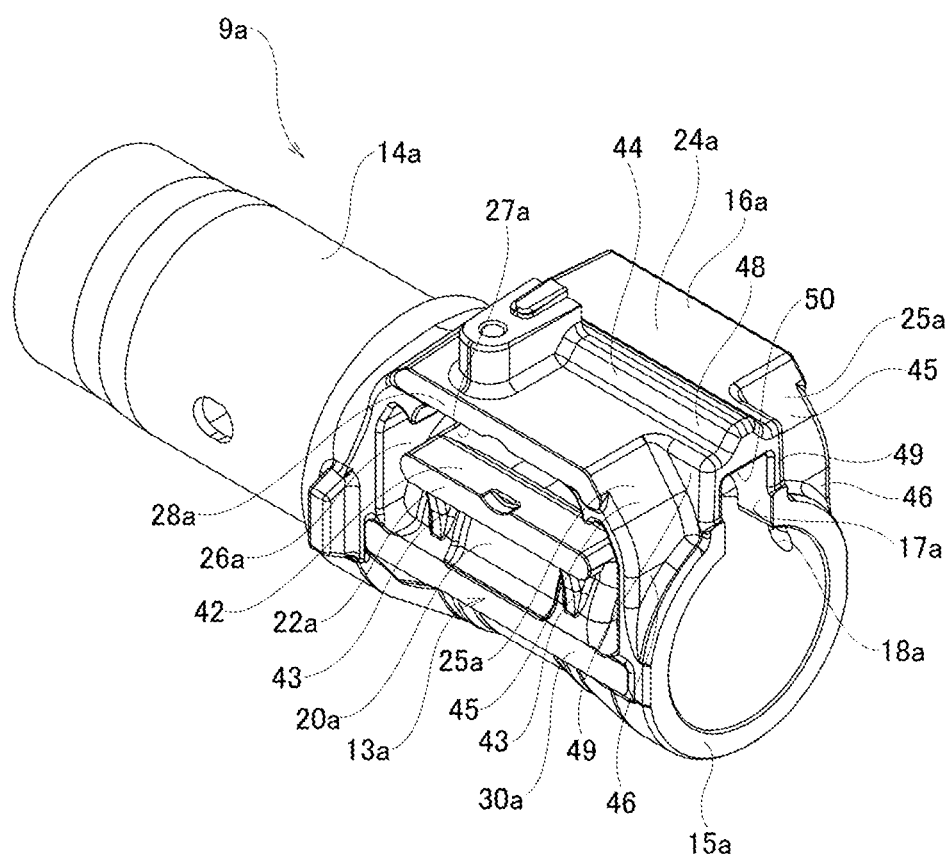
FIG. 14 is a perspective view as viewed from the lower side and the front side of the outer column of this example.
Figure 15:
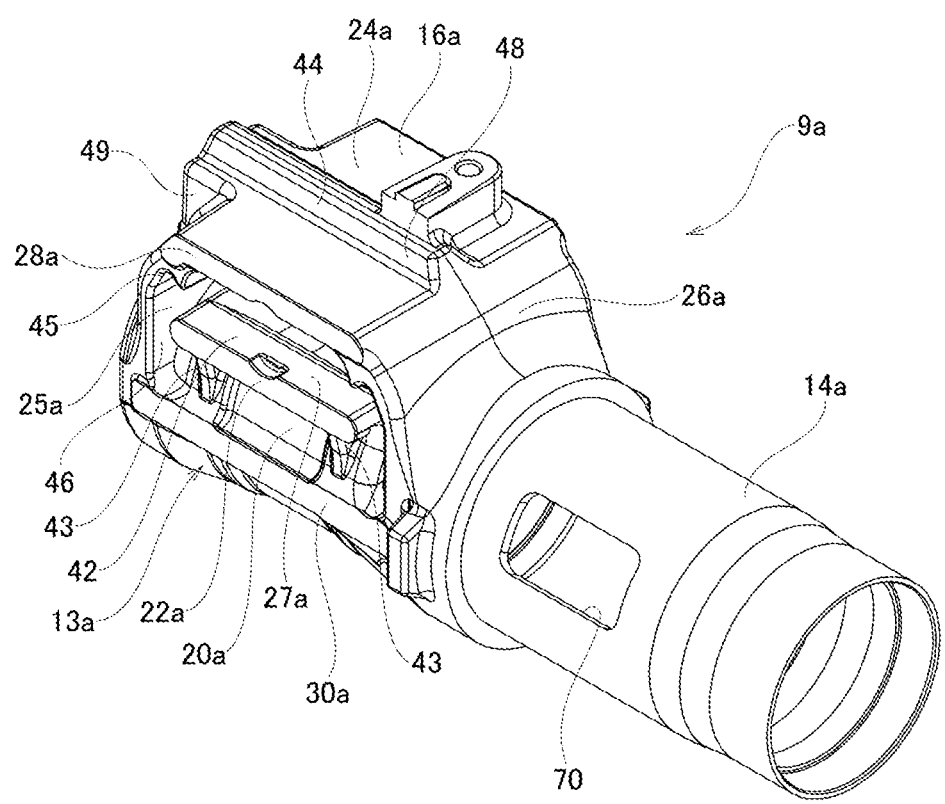
FIG. 15 is a perspective view as viewed from the lower side and the rear side of the outer column of this example.
Figure 16:
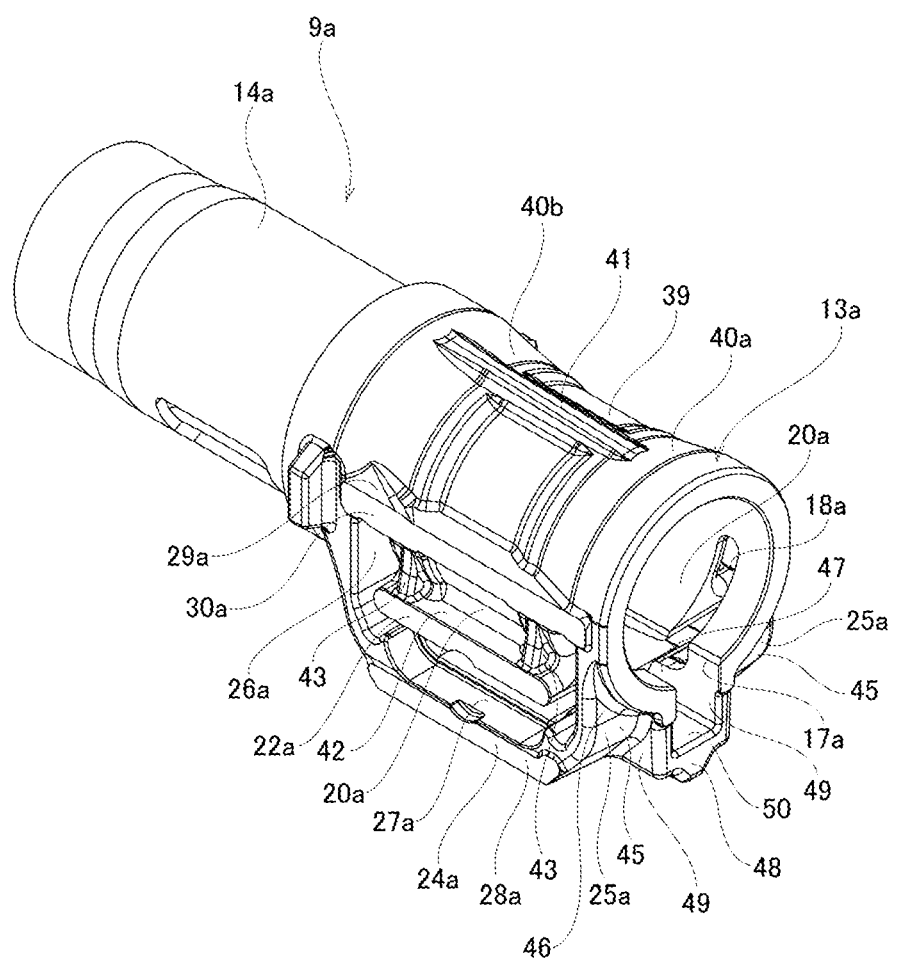
FIG. 16 is a perspective view as viewed from the upper side and the front side of the outer column of this example.

As illustrated in FIGS. 10, 12, and 13, a front-rear direction slit 17a that extends in the front-rear direction is provided in the central portion in the width direction of the lower surface of the column main body portion 15a. The front-rear direction slit 17a opens to the front-end surface of the column main body portion 15a, but does not open to the rear-end surface of the column main body portion 15a. The rear-end portion of the front-rear direction slit 17a is located at the rear-side portion of the column main body portion 15a. The front-side portion and the rear-side portion of the lower-half portion of the column main body portion 15a are respectively provided with a front-side circumferential-direction slit 18a and a rear-side circumferential-direction slit 19a that extend in the circumferential direction. As illustrated in FIG. 13, the front-side circumferential-direction slit 18a is formed so as to cross in the circumferential direction the front-side portion of the front-rear direction slit 17a, and the rear-side circumferential-direction slit 19a is formed so as to cross in the circumferential direction the rear-end portion of the front-rear direction slit 17a. The front-side circumferential-direction slit 18a is located in the intermediate portion in the front-rear direction of the front-side thick-walled portion 40a, and the rear-side circumferential-direction slit 19a is located in the intermediate portion in the front-rear direction of the rear-side thick-walled portion 40b. Both end portions in the circumferential direction of the front-side circumferential-direction slit 18a and both end portions in the circumferential direction of the rear-side circumferential-direction slit 19a are located at portions substantially overlapping in the vertical direction with the center axis of the outer column 9a.

The column main body portion 15a includes a pair of clamp portions 20a on both sides in the width direction. More specifically, the pair of clamp portions 20a are provided in portions on both sides in the width direction of the column main body portion 15a that are surrounded on three sides, or in other words, on the inside in the width direction, the front side and the rear side by the front-rear direction slit 17a, the front-side circumferential-direction slit 18a, and the rear-side circumferential-direction slit 19a. Below the pair of clamp portions 20a, there are an elongated telescopic adjustment hole 27a that extends in the front-rear direction. Each of the pair of clamp portions 20a has a cantilever structure in which both end portions in the front-rear direction and the lower-end portion are free ends, and only the upper-end portion is connected to the column main body portion 15a. Therefore, the pair of clamp portions 20a has a lower rigidity in the width direction than the other portions of the sandwiched portion 13a and may be elastically deformed in the width direction. In other words, the pair of clamp portions 20a is configured so that the inner diameter may be elastically expanded and contracted.

Figure 7:
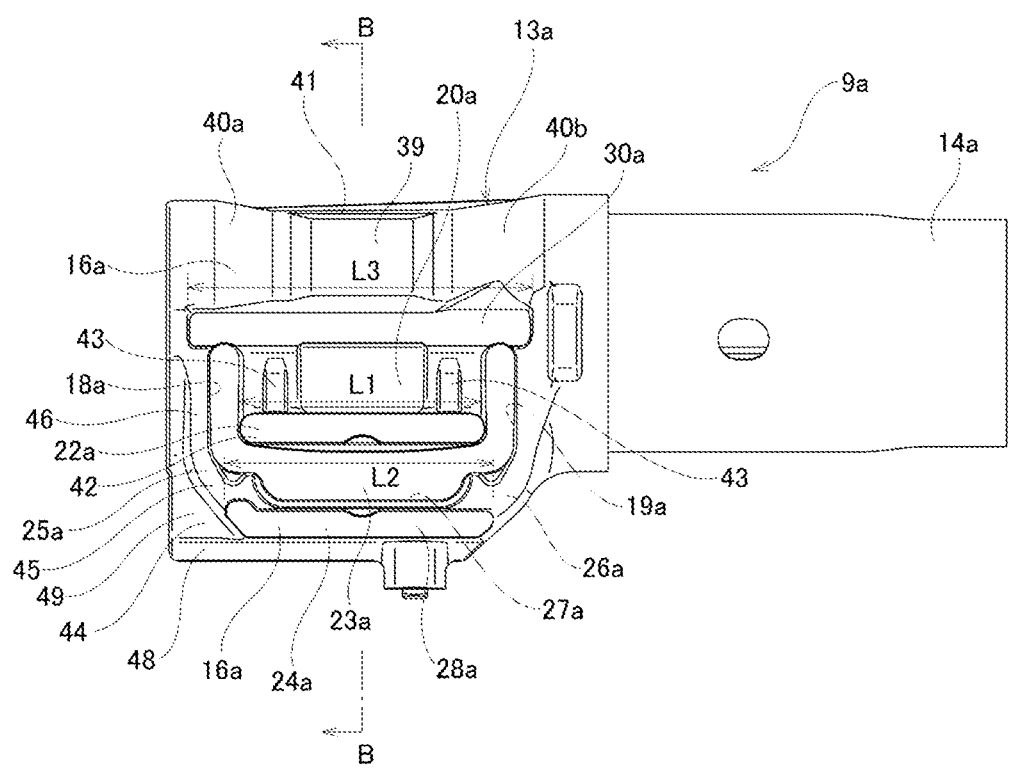
FIG. 7 is a side view of the outer column of this example.
Figure 8:
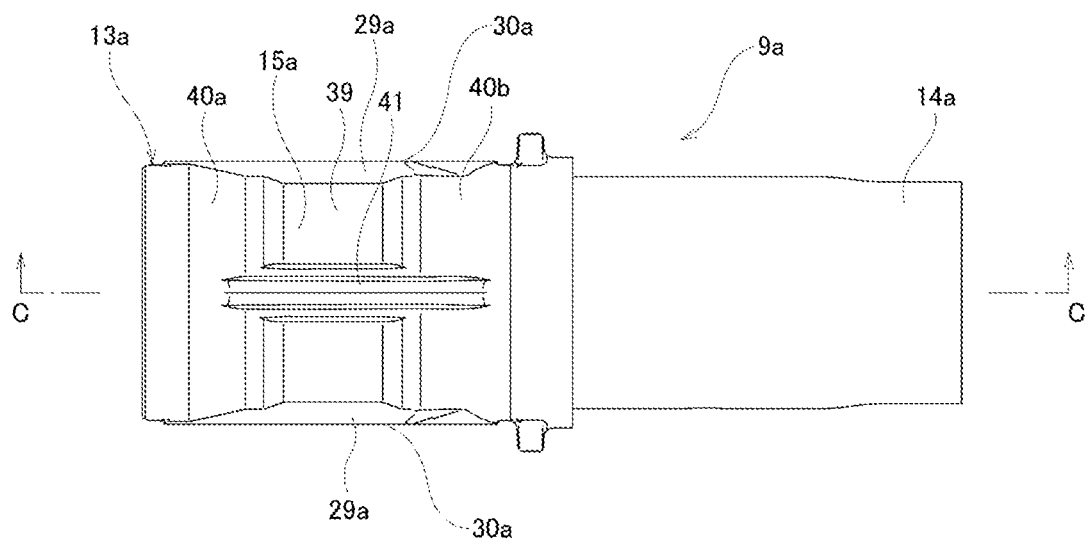
FIG. 8 is a plan view of the outer column of this example.
Figure 9:
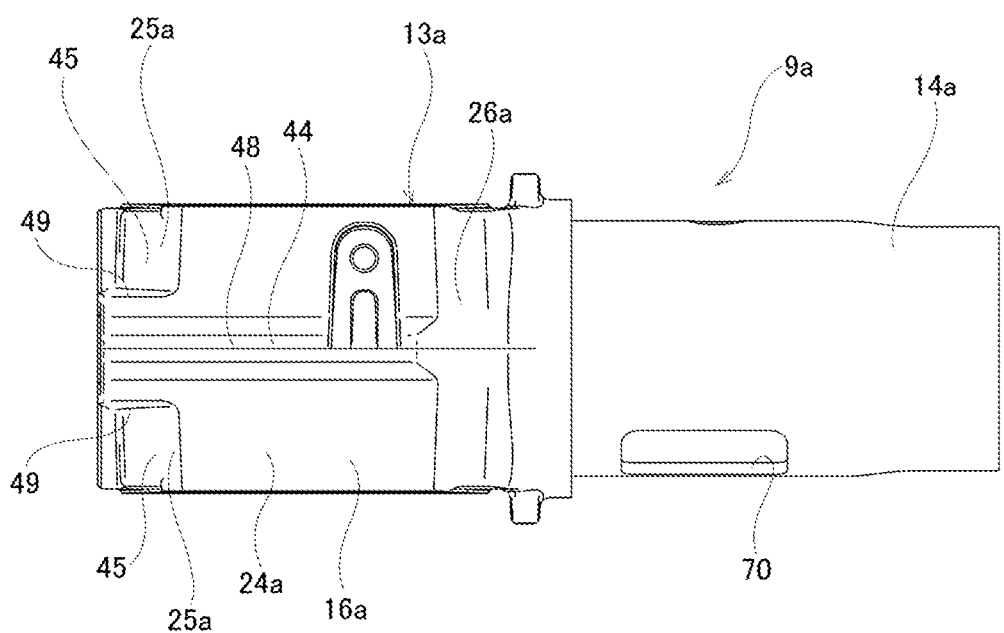
FIG. 9 is a bottom view of the outer column of this example.

The pair of clamp portions 20a has a partially cylindrical inner-circumferential surface. As illustrated in FIG. 7, the front-side portion of the pair of clamp portions 20a is composed of the rear-side portion of the thick-walled portion 40a, and the intermediate portion in the front-rear direction of the pair of clamp portions 20a is composed of the thin-walled portion 39, and the rear-side portion of the pair of the clamp portions 20a is composed of the front-side portion of the thick-walled portion 40b. A flat plate-shaped overhanging-plate portion 42 that projects toward the outside in the width direction is provided at the lower-end portion of the outer-side surface (outer-circumferential surface) in the width direction of each of the pair of clamp portions 20a. The overhanging-plate portions 42 are arranged so as to extend over the entire length of the pair of clamp portions 20a in the front-rear direction. The tip-end surfaces (outer-side surface in the width direction) of the overhanging-plate portions 42 form flat surface shaped first tightening surfaces 22a that receive a tightening force from the inner-side surfaces in the width direction of a pair of support plate portions 21a of the upper bracket 5a.

A flat plate-shaped lateral rib 43 that connects the upper surface of the overhanging-plate portion 42 and the outer-side surface in the width direction of the clamp portion 20a is provided between the upper surface of the overhanging-plate portion 42 and the side surface in the width direction of each of the pair of clamp portions 20a. A plurality (two in the illustrated example) of lateral ribs 43 are arranged on each side in the width direction being separated from each other in the front-rear direction.

The reinforcing bridge portion 16a has a function of improving the torsional rigidity of the outer column 9a. The reinforcing bridge portion 16a is arranged so as to cover the pair of clamp portions 20a via a substantially U-shaped gap 23a as viewed from the width direction, and is integrally formed with the column main body portion 15a. The reinforcing bridge portion 16a includes a bottom-plate portion 24a, a front-side connecting portion 25a, a rear-side connecting portion 26a, and a reinforcing rib 44, and has a shape like an inverted mountain as viewed from the width direction, or in other words, a substantially trapezoidal shape having no upper side.

The bottom-plate portion 24a is formed in a substantially flat plate shape, is arranged below the pair of clamp portions 20a substantially parallel to the center axis of the outer column 9a, and extends in the front-rear direction and the width direction. An elongated telescopic adjustment hole 27a forming the lower side of a substantially U-shaped gap 23a is arranged between the bottom-plate portion 24a and the lower-end portions (overhanging-plate portions 42) of the pair of clamp portions 20a. The front-end portion of the elongated telescopic adjustment hole 27a opens at the lower-end portion of the front-side circumferential-direction slit 18a, and the rear-end portion of the elongated telescopic adjustment hole 27a opens at the lower-end portion of the rear-side circumferential-direction slit 19a. The front-end portion of the bottom-plate portion 24a is located a little further toward the rear side than the front-side circumferential-direction slit 18a, and the rear-end portion of the bottom-plate portion 24a is located a little further toward the front side than the rear-side circumferential-direction slit 19a. Both outer-side surfaces in the width direction of the bottom-plate portion 24a form flat surface shaped second tightening surfaces (seat surfaces) 28a that receive a tightening force from the inner-side surfaces in the width direction of the pair of support plate portions 21a. The second tightening surfaces 28a are located below the first tightening surfaces 22a. The second tightening surfaces 28a are arranged on both outer-side surfaces in the width direction of the bottom-plate portion 24a, which is a portion having higher rigidity in the width direction than the overhanging-plate portions 42 in which the first tightening surfaces 22a are arranged.

The front-side connecting portion 25a has a width dimension slightly shorter than that of the bottom-plate portion 24a, and connects both outer-side portions in the width direction of the front-end portion of the bottom-plate portion 24a and the portions of the lower surface of the column main body portion 15a that are adjacent to the front side of the front-side circumferential-direction slit 18a. In this example, the front-side connecting portion 25a has a front-side inclined portion 45 in a range extending from the lower-end portion to the intermediate portion that is inclined in a direction toward the front side going toward the upper side, and a front-wall portion 46 in the upper-end portion that extends only upward and is not inclined toward the front side. The upper-end portion of the inner-side portion in the width direction of the front-side inclined portion 45 connects to the lower surface of the column main body portion 15a. The front wall portion 46 extends toward the upper side from the upper-end portion of the outer-side portion in the width direction of the front-side inclined portion 45, and the upper-end portion of the front-wall portion 46 connects to the lower surface of the column main body portion 15a. The front-side connecting portion 25a (front-side inclined portion 45 and front-wall portion 46) is composed of two parts which are arranged apart from each other on both sides in the width direction. A rectangular hole 47 penetrating in the front-rear direction is provided between the two parts of the front-side inclined portions 45. The rectangular hole 47 communicates in the vertical direction with the front-rear direction slit 17a formed on the lower surface of the column main body portion 15a, and has the same dimension in the width direction as the front-rear direction slit 17a. It is also possible that the entire area from the lower-end portion to the upper-end portion of the front-side connecting portion 25a be composed of only the front-side inclined portion 45. The inclination angle of the front-side inclined portion 45 with respect to the vertical surface is preferably no less than 40 degrees and no more than 60 degrees, and more preferably no less than 40 degrees and no more than 50 degrees. Moreover, within this range, it is also possible to gradually change the inclination angle of the front-side inclined portion 45 with respect to the vertical surface (including being a curved surface).

The rear-side connecting portion 26a has a width dimension slightly shorter than that of the bottom-plate portion 24a, and connects the rear-end portion of the bottom-plate portion 24a and the portions of the lower surface of the column main body portion 15a that are adjacent to the rear side of the rear-side circumferential-direction slit 19a. In this example, the rear-side connecting portion 26a as a whole is inclined in a direction toward the rear side going toward the upper side. The rear-side connecting portion 26a may be configured by a rear-side inclined portion that is arranged in a range from the lower-end portion to the intermediate portion and that is inclined in a direction toward the rear side going toward the upper side, and a rear-wall portion that is arranged on the upper-end portion and that extends only toward the upper side and is not inclined toward the rear side; however, preferably the entire rear-side connecting portion 26a is inclined. The inclination angle of the rear-side connecting portion 26a (or the rear-side inclined portion) with respect to the vertical surface is preferably no less than 30 degrees and no more than 50 degrees, and more preferably no less than 40 degrees and no more than 50 degrees. Moreover, within this range, it is also possible to gradually change the inclination angle of the rear-side connecting portion 26a (or the rear-side inclined portion) with respect to the vertical surface (including being a curved surface).

As illustrated in FIG. 7, the reinforcing rib 44 has a substantially L-shape as viewed from the width direction, extends in the front-rear direction on the lower surface of the bottom-plate portion 24a, and is arranged so as to be continuous in a range extending from the lower surface of the bottom-plate portion 24a to the front surface of the front-side connecting portion 25a. The reinforcing rib 44 includes a first rib 48 that is arranged on the lower surface of the bottom-plate portion 24a and a second rib 49 arranged on the front surface of the front-side connecting portion 25a.

The first rib 48 has a substantially trapezoidal cross-sectional shape in which the thickness dimension in the width direction becomes smaller going downward, and extends linearly in the front-rear direction on the lower surface of the central portion in the width direction of the bottom-plate portion 24a. The front-end portion of the first rib 48 projects forward from the front-end portion of the bottom-plate portion 24a and covers the front-end portion of the front-rear direction slit 17a from below. The rear-end portion of the first rib 48 is located at the rear-end portion of the bottom-plate portion 24a. The plate thickness (dimension in the vertical direction) of the portion of the bottom-plate portion 24a provided with the first rib 48 is larger than the plate thickness of the portion of the bottom-plate portion 24a that is separated from the first rib 48.

The second rib 49 has a substantially triangular plate shape as viewed from the width direction, extends toward the upper side from the front-end portion of the first rib 48, and connects to the front surface of the front-side inclined portion 45 of the front-side connecting portion 25a. In other words, the second rib 49 is arranged so as to extend and be held between the front-end portion of the first rib 48 that projects forward from the front-end portion of the bottom-plate portion 24a and the front surface of the front-side connecting portion 25a (front-side inclined portion 45). The second rib 49 has two parts which are arranged apart from each other on both sides in the width direction of the space existing between the upper surface of the front-end portion of the first rib 48 and the front-end portion of the front-rear direction slit 17a. The lower-end portions of the two parts of the second rib 49 are connected to both side portions in the width direction of the front-end portion of the first rib 48.

A rectangular groove 50 that communicates in the front-rear direction with the rectangular hole 47 is provided between the upper surface of the front-end portion of the first rib 48 and the inner-side surfaces in the width direction of the second rib 49. The rectangular groove 50 is continuous in the vertical direction with the front-rear direction slit 17a of the column main body portion 15a, and has the same width dimension as the front-rear direction slit 17a.

In this example, by providing the reinforcing bridge portion 16a, the torsional rigidity of the outer column 9a is improved, and a substantially U-shaped gap 23 as viewed from the width direction is provided between the reinforcing bridge portion 16a and the clamp portion 20a. Moreover, a space extending in the front-rear direction between the lower-end portion of the clamp portions 20a and the upper surface of the bottom-plate portion 24a form an elongated telescopic adjustment hole 27a for inserting the adjustment rod 33a in the width direction.

Ridge portions 29a that protrude to the outer side in the width direction and extend in the front-rear direction are provided in portions of both side surfaces in the width direction of the column main body portion 15a that overlap in the vertical direction with the center axis of the outer column 9a. The tip-end surfaces (outer-side surfaces in the width direction) of the ridge portions 29a form flat surface shaped third tightening surfaces 30a that receive a tightening force from the inner-side surfaces in the width direction of the pair of support plate portions 21a. The third tightening surfaces 30a are arranged on both side surfaces in the width direction of the column main body portion 15a, which are portions having higher rigidity in the width direction than the overhanging-plate portions 42 in which the first tightening surfaces 22a are arranged.

As illustrated in FIG. 12, in a state where no pressing force is applied from the pair of support plate portions 21a to the sandwiched portion 13a of the outer column 9a, the space H1 in the width direction between the first tightening surfaces 22a, the space H2 in the width direction between the second tightening surfaces 28a, and the space H3 in the width direction between the third tightening surfaces 30a satisfy the relation H1=H3>H2. In other words, a first tightening surface 22a and a third tightening surface 30a are located on the same virtual plane on one side in the width direction, and a first tightening surface 22a and a third tightening surface 30a are located on the same virtual plane on the other side in the width direction. The second tightening surfaces 28a are located further on the inner side in the width direction than the first tightening surfaces 22a and the third tightening surfaces 30a on both sides in the width direction.

As illustrated in FIG. 7, the dimension L1 in the front-rear direction of the first tightening surfaces 22a, the dimension L2 in the front-rear direction of the second tightening surfaces 28a, and the dimension in the front-rear direction of the third tightening surfaces 30a satisfy the relation L1<L2<L3. The first tightening surfaces 22a may be arranged at the central portion in the vertical direction between the second tightening surfaces 28a and the third tightening surfaces 30a; however, may also be arranged so as to be offset to the second tightening surface 28a side (lower side) or the third tightening surface 30a side (upper side).

In the illustrated example, positions of the central portion in the front-rear direction of the first tightening surfaces 22a, the central portion in the front-rear direction of the second tightening surfaces 28a, and the central portion in the front-rear direction of the third tightening surfaces 30a all coincide with each other. However, the central portion in the front-rear direction of the first tightening surfaces 22a may be arranged so as to be offset to the front side or to the rear side with respect to the central portion in the front-rear direction of the second tightening surfaces 28a and the central portion in the front-rear direction of the third tightening surfaces 30a.

The upper bracket 5a has a function of supporting the outer column 9a with respect to the vehicle body 6, and is made of a metal plate such as steel, aluminum alloy and the like having sufficient rigidity, and includes a mounting plate portion 31a and a pair of support plate portions 21a. The mounting plate portion 31a is normally supported by the vehicle body 6; however, in the event of a collision accident, the mounting plate portion 31a is detached toward the front due to the impact of a secondary collision, which allows the outer column 9a to displace toward the front. More specifically, the mounting plate portion 31a is locked to the locking capsule 51, which is supported and fixed to the vehicle body 6, so that it is able to detached toward the front.

The mounting plate portion 31a includes a bridge portion 52 arranged in the central portion in the width direction and a pair of side plate portions 53 arranged on both sides in the width direction. The bridge portion 52 has an inverted U-shaped cross section and is arranged above the sandwiched portion 13a of the outer column 9a. The rigidity of the bridge portion 52 is maintained by being provided with a plurality (three in the illustrated example) of bracket ribs 54 that are separated in the front-rear direction. Each of the pair of side plate portions 53 has a flat plate shape. Each of the pair of side plate portions 53 is provided with a locking notch 55 that is open on the rear-end edge and to which the locking capsule 51 is engaged.

Figure 5:
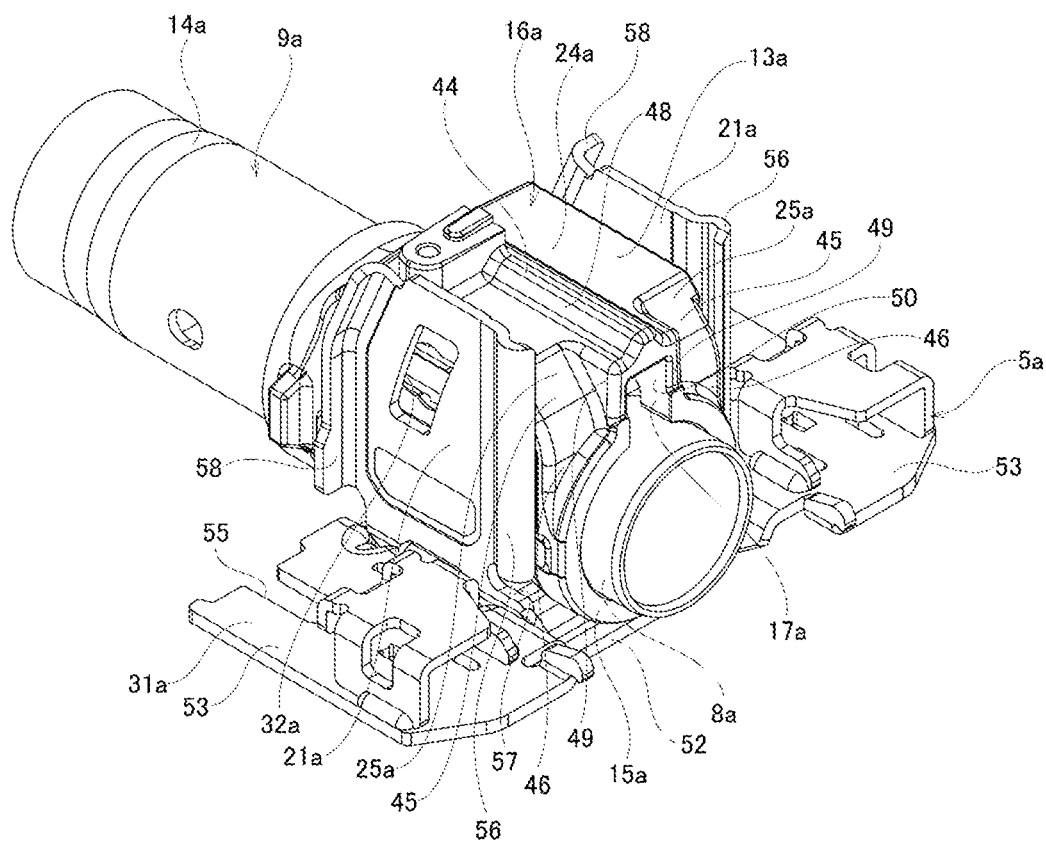
FIG. 5 is a perspective view as viewed from the lower side and the front side of the inner column, the outer column, and the upper bracket of this example.
Figure 6:
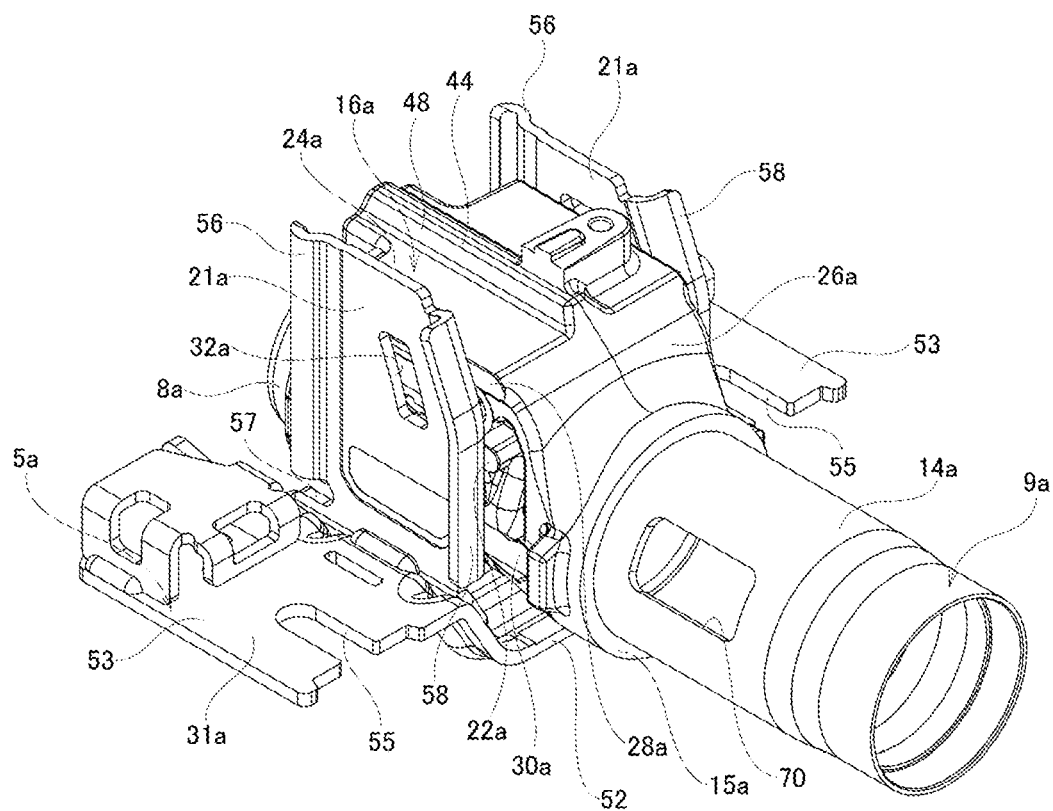
FIG. 6 is a perspective view as viewed from the lower side and the rear side of the inner column, the outer column, and the upper bracket of this example.

The upper-end portions of the pair of support plate portions 21a are fixed to both side portions in the width direction of the lower surface of the bridge portion 52 by welding or the like. The pair of support plate portions 21a are arranged substantially parallel to each other on both sides in the width direction of the sandwiched portion 13a of the outer column 9a. Each of the pair of support plate portions 21a is provided with an elongated tilt adjustment hole 32a that extends in the vertical direction in a partial arc shape centered on the tilt shaft 12. The front-end portion of each the pair of support plate portions 21a is provided with a reinforcing ridge 56 that extends in the vertical direction. The upper-end portion of the reinforcing ridge 56 is not continuous with the bridge portion 52, and as illustrated in FIG. 5 and FIG. 6, there is a slit 57 that extends in the front-rear direction between the upper-end portion of the reinforcing ridge 56 and the bridge portion 52. The reinforcing ridge 56 is curved such that the outer side in the width direction is convex, and has a semicircular arc shaped cross-sectional shape. The rear-end portion of each the pair of support plate portions 21a is provided with a bent plate portion 58 that extends in the vertical direction. The bent plate portions 58 are formed by bending the rear-end portions of the pair of support plate portions 21a toward the outer side in the width direction at a substantially right angle. The reinforcing ridges 56 and the bent plate portions 58 have a function of increasing the bending rigidity (torsional strength) of the pair of support plate portions 21a.

Figure 1:
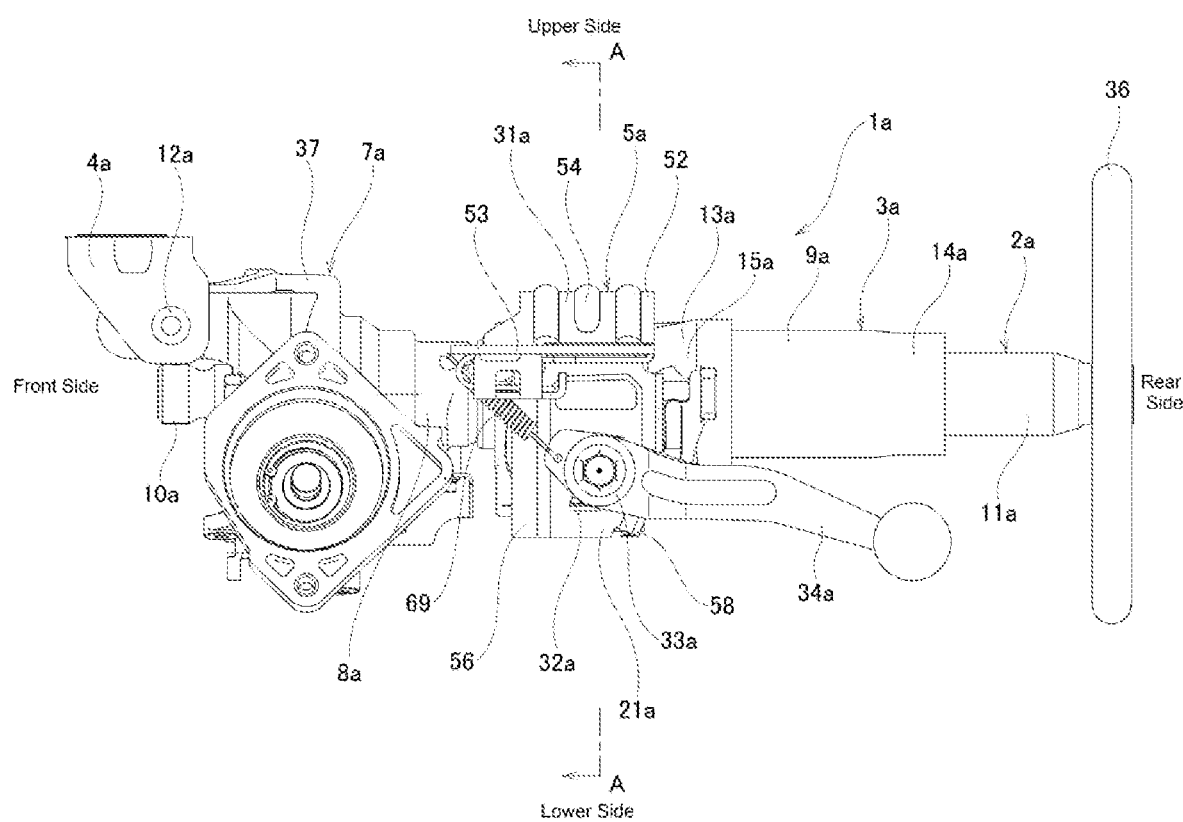
FIG. 1 is a side view of an example of a steering device according to an embodiment of the present invention.
Figure 2:
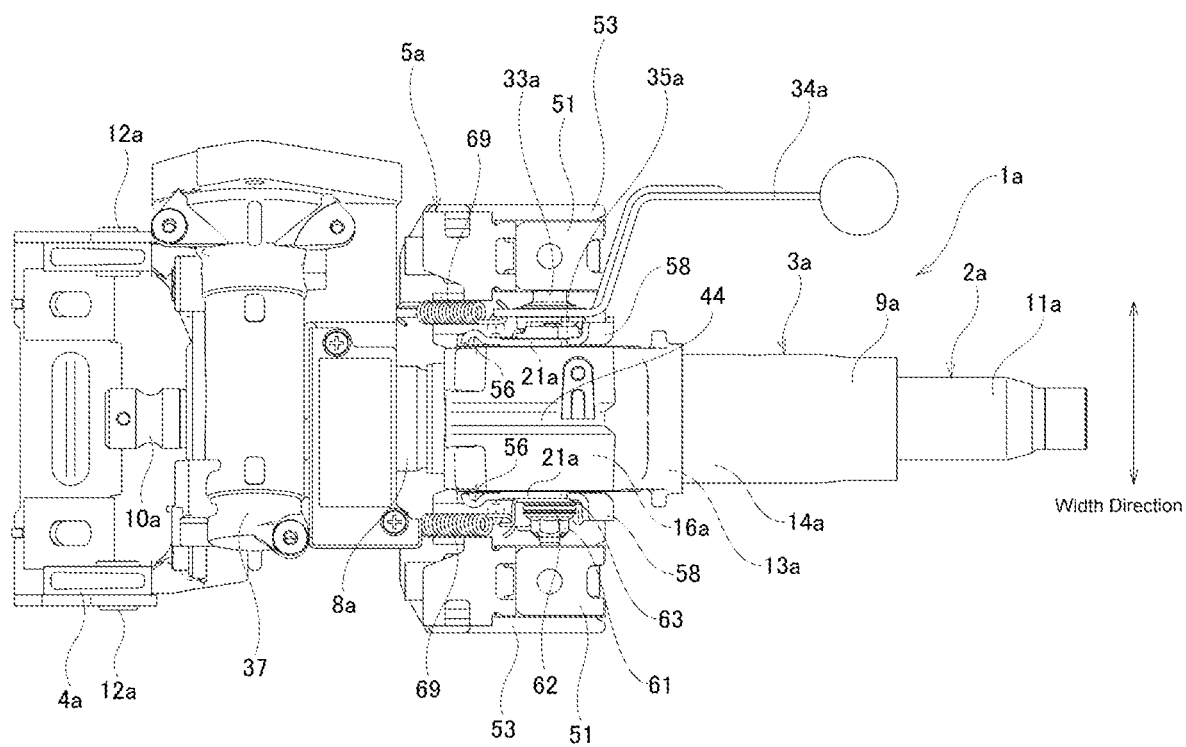
FIG. 2 is a bottom view of the steering device of this example.
Figure 3:
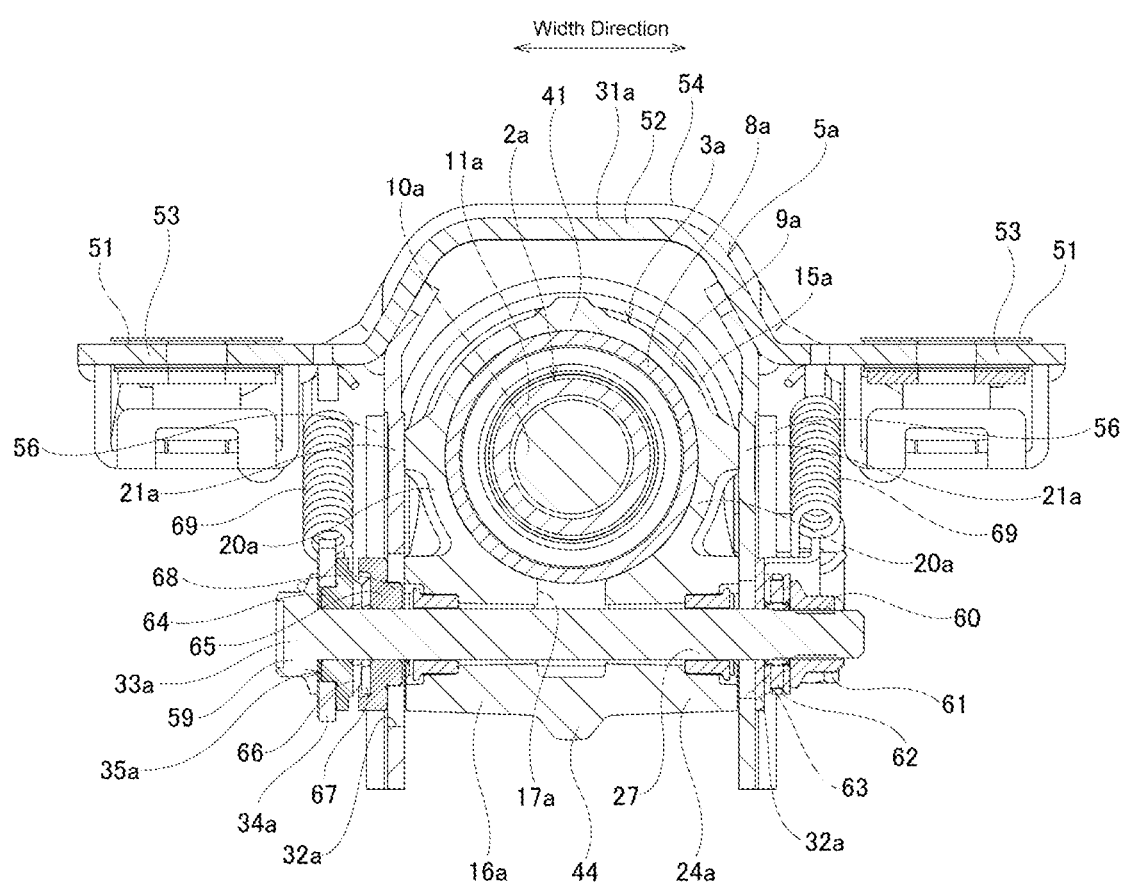
FIG. 3 is a cross-sectional view taken along section line A-A in FIG. 1.
Figure 4:
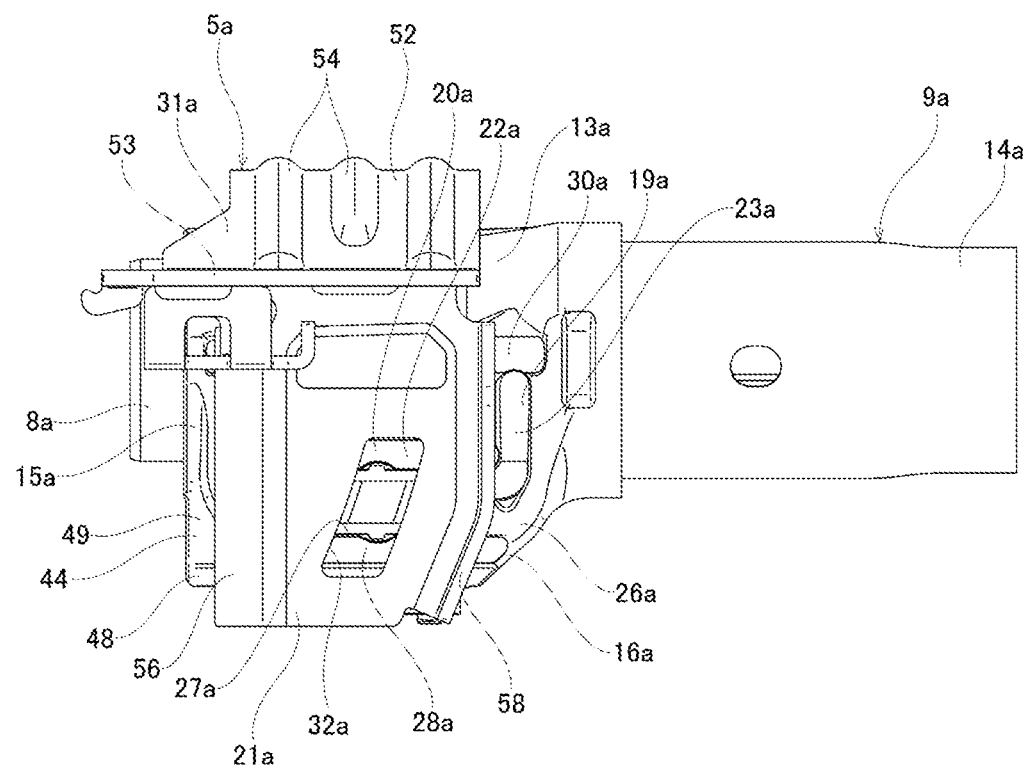
FIG. 4 is a side view of an inner column, an outer column, and an upper bracket of the steering device of this example.

As illustrated in FIG. 3, in the steering device 1a of this example, the adjustment rod 33a is arranged in the width direction so as to be inserted in the width direction through the elongated telescopic adjustment hole 27a and the elongated tilt adjustment holes 32a. The adjustment rod 33a has a head portion 59 at one end portion (left end portion in FIG. 3) and a male screw portion 60 at the other end portion (right end portion in FIG. 3). On one end side of the adjustment rod 33a, an adjustment lever 34a and a cam device 35a are arranged in that order from the outer side in the width direction around a portion that protrudes from the outer-side surface in the width direction of one support plate portion 21a (left one in FIG. 3) of the pair of support plate portions 21a. In other words, the adjustment lever 34a and the cam device 35a are arranged between the head portion 59 and the outer-side surface in the width direction of the one support plate portion 21a. On the other end side of the adjustment rod 33a, a nut 61, a thrust bearing 62, and a pressure plate 63 are arranged in that order from the outer side in the width direction around a portion that protrudes from the outer-side surface in the width direction of the other support plate portion 21a (right one in FIG. 3) of the pair of support plate portions 21a. The nut 61 is screwed onto the male screw portion 60 on the other end portion of the adjustment rod 33a.

In the steering device 1a of this example, an expansion/contraction mechanism includes the adjustment lever 34a and the cam device 35a, and by pivotally moving the adjustment lever 34a to expand or contract the dimension in the axial direction of the cam device 35a, the distance between the inner-side surfaces in the width direction of the pair of support plate portions 21a may be expanded or contracted. In other words, it is possible to adjust the magnitude of the clamping force by the pair of support plate portions 21a.

The cam device 35a is configured by combining a drive-side cam 64 and a driven-side cam 65, with the drive-side cam 64 being arranged on the outer side in the width direction, and the driven-side cam 65 being arranged on the inner side in the width direction. The base-end portion of the adjustment lever 34a is fixed to the drive-side cam 64 so as not to be able to rotate relative to each other.

The drive-side cam 64 and the driven-side cam 65 are both made of sintered metal, and are formed as a whole into a circular plate shape. A drive-side cam surface 66, which is an uneven surface in the circumferential direction, is provided on the inner-side surface in the width direction of the drive-side cam 64 (right-side surface in FIG. 3). A driven-side cam surface 67, which is an uneven surface in the circumferential direction, is provided on the outer-side surface in the width direction of the driven-side cam 65 (left-side surface in FIG. 3). A substantially rectangular plate-shaped convex engaging portion 68 that projects inward in the width direction is provided on the inner-side surface in the width direction of the driven-side cam 65. The convex engaging portion 68 of the driven-side cam 65 engages with the elongated tilt adjustment hole 32a of the one support plate portion 21a so that only displacement along the elongated tilt adjustment hole 32a is possible.

Tension springs 69 are arranged on both sides in the width direction of the pair of support plate portions 21a. Of the pair of tension springs 69, one tension spring 69 spans between one side plate portion 53 of the pair of side plate portions 53 and the base-end portion of the adjustment lever 34a, and the other tension spring 69 spans between the other side plate portion 53 of the pair of side plate portions 53 and the pressure plate 63. The pair of tension springs 69 prevents the steering column 3a from tilting to where the steering wheel 36 will fall when the clamping force is released.

The steering device 1a of this example includes a steering lock device that is a kind of anti-theft device for vehicles. The tubular portion 14a of the outer column 9a is provided with a lock through hole 70. A lock unit (not illustrated) is supported by and fixed around the lock through hole 70, and a key lock collar (not illustrated) is press-fitted into a portion of a part of the steering shaft 2a, the position of which coincides with the lock unit in the front-rear direction. When the ignition key is turned OFF, the tip-end portion of a lock pin of the lock unit is displaced toward the inside in the radial direction and engages with a concave key lock portion provided on the outer-circumferential surface of the key lock collar. As a result, rotation of the steering shaft 2a becomes substantially impossible.

In the steering device 1a of this example, to maintain the steering wheel 36 at a desired position, the steering wheel 36 is moved to a desired position, after which the adjustment lever 34a is moved in a specified direction (generally upward) centered on the adjustment rod 33a. As a result, a convex portion of the drive-side cam surface 66 and a convex portion of the driven-side cam surface 67 are brought into contact with each other, the dimension in axial direction of the cam device 35a is expanded, and the space between inner-side surfaces in the width direction of the pair of support plate portions 21a is reduced. At this time, the first tightening surfaces 22a, the second tightening surfaces 28a, and the third tightening surfaces 30a are pressed by the inner-side surfaces in the width direction of the pair of support plate portions 21a. The intermediate portion in the vertical direction of the pair of support plate portions 21a and the clamp portions 20a are elastically deformed toward the inside in the width direction to hold the outer-circumferential surface of the inner column 8a from both sides in the width direction. As a result, the steering wheel 36 is maintained at the adjusted position.

When adjusting the position of the steering wheel 36, the adjustment lever 34a is pivotally moved in a direction opposite to the specified direction (generally downward). As a result, the convex portion of the drive-side cam surface 66 and the convex portion of the driven-side cam surface 67 are alternately arranged in the circumferential direction, the dimension in the axial direction of the cam device 35a is reduced, and the distance between the inner-side surfaces in the width direction of the pair of support plate portions 21a is widened. As a result, the pressing force by the pair of support plate portions 21a is reduced, and thus the clamp portions 20a are elastically restored and the force for holding the outer-circumferential surface of the inner column 8a is reduced. In this state, the front-rear position and the vertical position of the steering wheel 36 may be adjusted within a range in which the adjustment rod 33a is able to move inside the elongated telescopic adjustment hole 27a and the elongated tilt adjustment holes 32a.

Figure 17:
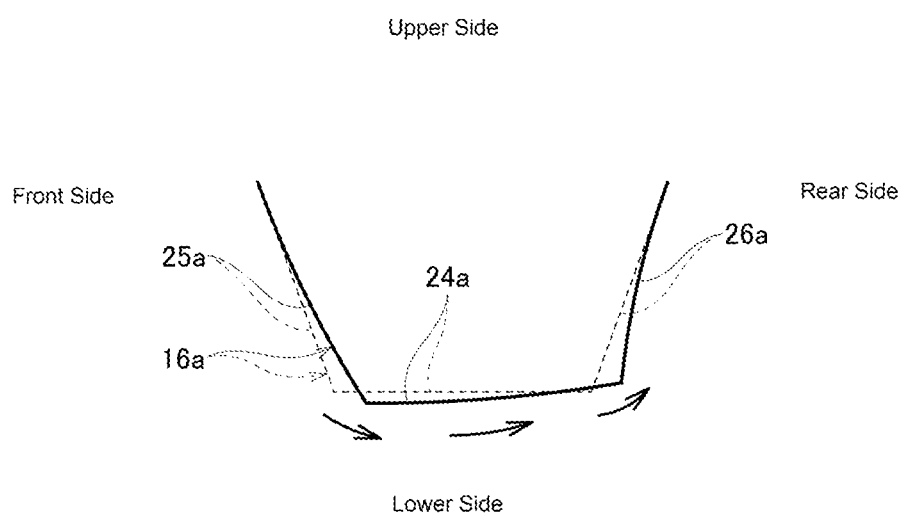
FIG. 17 is a schematic view for explaining the deformation of the outer column of this example that occurs in the reinforcing bridge portion provided with only a first characteristic portion in a case where an upward force is applied to the steering wheel.

In particular, in this example, the rigidity of the outer column 9a may be improved, and the inclination of the outer column 9a with respect to the inner column 8a may be suppressed. More specifically, as a first feature of the outer column 9a of this example, the front-side connecting portion 25a (in this example, the front-side inclined portion 45) of the reinforcing bridge portion 16a is inclined in a direction toward the front side going toward the upper side, and the rear-side connecting portion 26a of the reinforcing bridge portion 16a is inclined in a direction toward the rear side going toward the upper side. The entire reinforcing bridge portion 16a is formed in a shape like an inverted mountain (trapezoidal shape) as viewed from the width direction. The ability of this configuration to suppress deformation of the reinforcing bridge portion 16a will be described with reference to FIG. 17. FIG. 17 illustrates the reinforcing bridge portion as viewed from the width direction; however, the deformed state of the reinforcing bridge portion is exaggerated. The same is true in FIG. 18.

Figure 22:
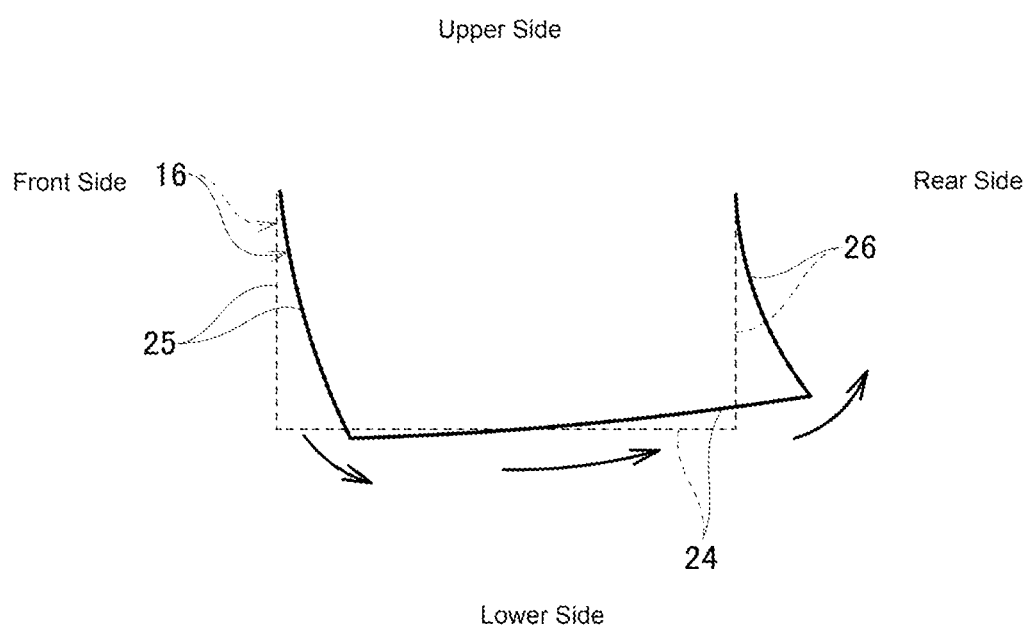
FIG. 22 is a schematic view for explaining the deformation of a steering device having a conventional structure that occurs in a reinforcing bridge portion when an upward force is applied to the steering wheel.

When an upward force is applied to the steering wheel 36 and a force indicated by the arrows in FIG. 17 is applied to the reinforcing bridge portion 16a, the reinforcing bridge portion 16a is deformed into the shape indicated by the solid lines. In other words, since the rear-side connecting portion 26a withstands the force in a direction toward the rear side and the upper side, the deformation of the rear connecting portion 26a toward the rear side is sufficiently suppressed. Therefore, the movement of the bottom-plate portion 24a toward the rear side and the upper side is suppressed. The front-side connecting portion 25a is not able to sufficiently support the force toward the rear side and the downward side, and is slightly deformed to the rear side. Therefore, the included angle between the bottom plate portion 24a and the front-side connecting portions 25a is slightly widened, and the bottom-plate portion 24a is deformed so as to bulge downward. However, the deformation of the front-side connecting portions 25a of this example is suppressed to be smaller than the deformation of the front-side connecting portion of a conventional structure in which the structure extends only upward and does not incline toward the front side. In this way, even in a case where only this first feature is provided, the deformation of the reinforcing bridge portion 16a may be suppressed as compared with the case of the conventional structure illustrated in FIG. 22.

Figure 18:
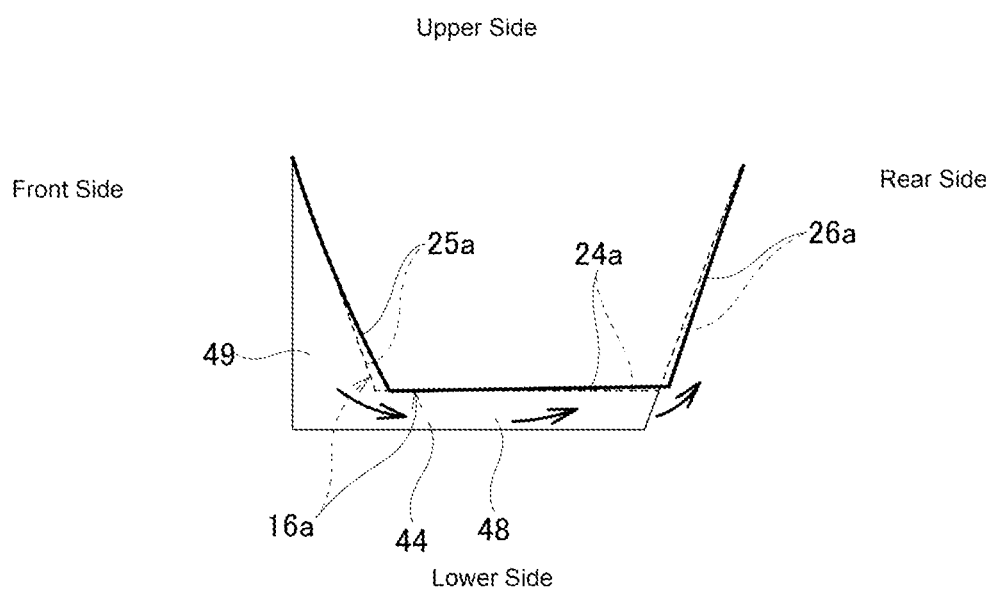
FIG. 18 is a schematic view for explaining the deformation of the outer column of this example that occurs in the reinforcing bridge portion provided with a first characteristic portion and a second characteristic portion in a case where an upward force is applied to the steering wheel.

In the outer column 9a of this example, in order to more effectively suppress deformation of the reinforcing bridge portion 16a, in addition to the first feature, as a second feature, the reinforcing rib 44 extends in the front-rear direction on the lower surface of the bottom-plate portion 24a, and are arranged so as to be continuous in a range from the lower surface of the bottom-plate portion 24a to the front surfaces of the front-side connecting portion 25a. As a result, as indicated in FIG. 18 by the broken lines for the state before deformation and indicated by the solid lines for the state after deformation, the deformation of the reinforcing bridge portion 16a may be sufficiently suppressed. In other words, the reinforcing rib 44 is arranged on the lower surface of the bottom-plate portion 24a so as to extend in the front-rear direction, and therefore the bending rigidity of the bottom-plate portion 24a is sufficiently improved, and deformation causing the bottom-plate portion 24a to bulge downward is effectively prevented. The reinforcing rib 44 is continuously arranged in a range extending from the lower surface of the bottom-plate portion 24a to the front surfaces of the front-side connecting portion 25a, and thus the reinforcing rib 44 reinforces the continuous portion between the bottom-plate portion 24a and the front-side connecting portions 25a from the outer side, and the front-side connecting portion 25a is prevented from being deformed so that the included angle between the bottom-plate portion 24a and the front-side connecting portions 25a is widened. In this example, the deformation of the reinforcing bridge portion 16a can be kept sufficiently smaller than that illustrated in FIG. 17. As a result, in this example, the rigidity of the outer column 9a can be sufficiently improved, and even in a case where a push-up load is applied to the steering wheel 36, the outer column 9a is effectively prevented from tiling with respect to the inner column 8a with the pair of clamp portions 20a as fulcrums. Therefore, this example is advantageous from the aspect of smoothly contracting the inner column 8a and the outer column 9a.

Figure 21:
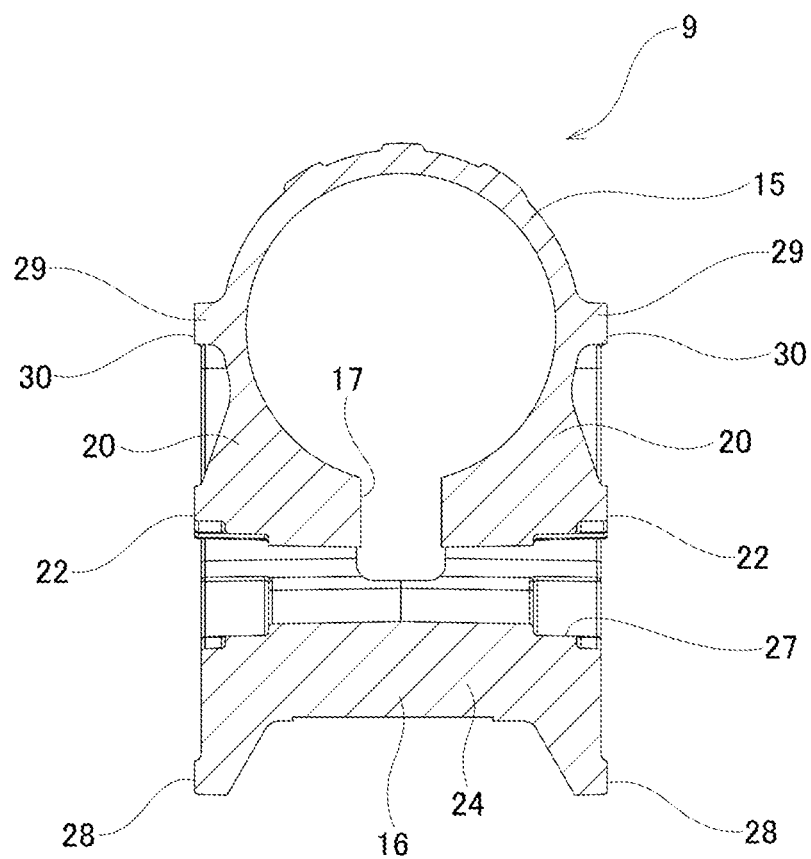
FIG. 21 is a cross-sectional view taken along section line D-D in FIG. 20.
Figure 23:
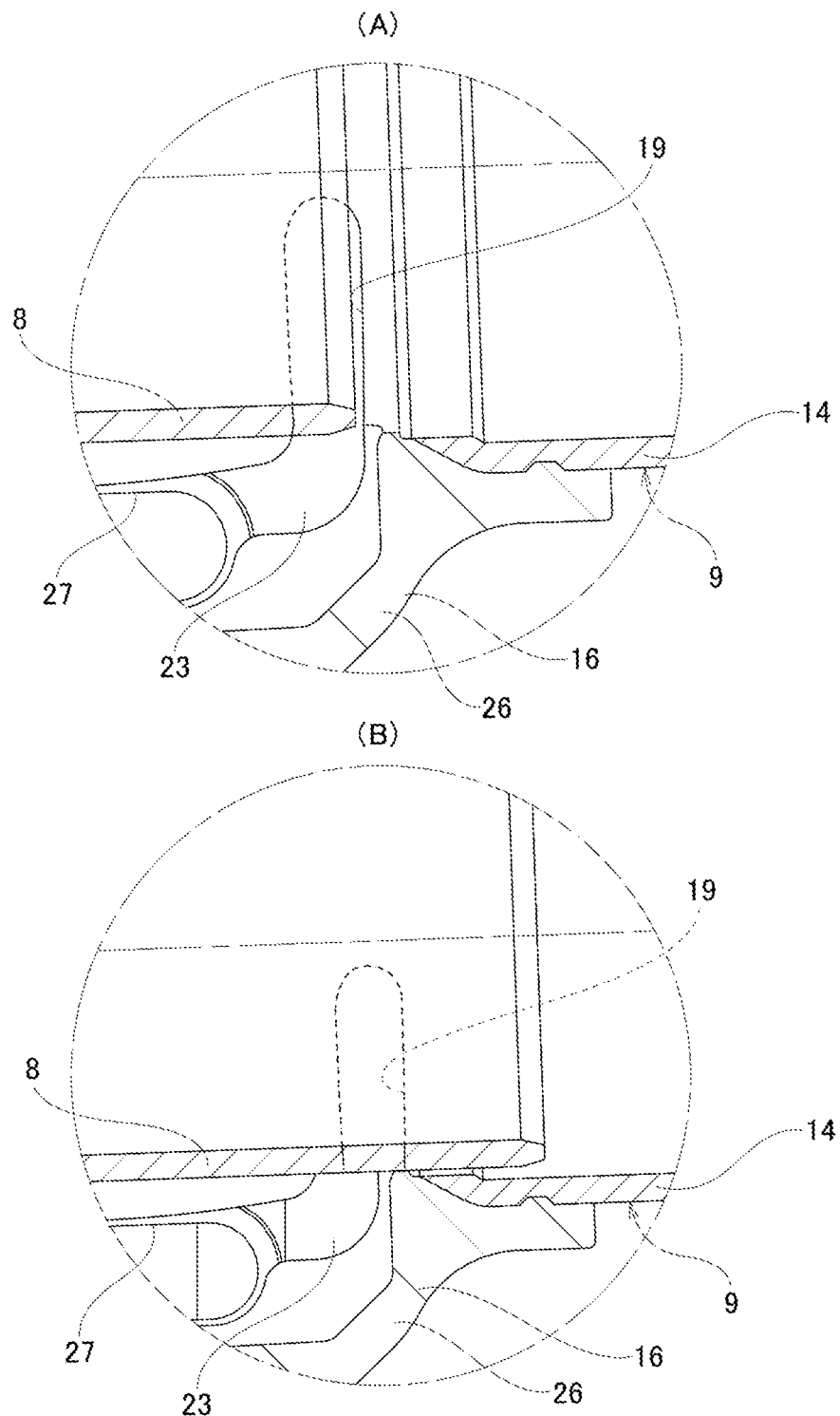
FIG. 23A and FIG. 23B are enlarged cross-sectional views of a portion corresponding to the portion E in FIG. 20; where

In this example, by maximizing the displacement of the steering wheel 36 to the rear side, even in a case where positions in the front-rear direction of the rear-end portion of the inner column 8a and the rear-side circumferential-direction slit 19a illustrated in FIG. 23A coincide with each other, deformation of the reinforcing bridge portion 16a is sufficiently suppressed. Therefore, the inclination of the outer column 9a with respect to the inner column 8a may be sufficiently suppressed. In the structure of this example, the plate thickness of the bottom-plate portion 24a of the reinforcing bridge portion 16a is smaller than that of the conventional structure illustrated in FIG. 21, and the rigidity of the bottom-plate portion 24a is lower; however, the first feature and the second feature are provided, and thus it is possible to further improve the rigidity of the outer column 9a as a whole. The plate thickness of the bottom-plate portion 24a is reduced, and therefore the size of the outer column 9a and the upper bracket 5a may be reduced.

In this example, the first tightening surfaces 22a for elastically deforming the pair of clamp portions 20a, and the second tightening surfaces 28a and the third tightening surfaces 30a for transmitting torque acting on the outer column 9a to the inner-side surfaces in the width direction of the pair of support plate portions 21a of the upper bracket 5a in a case such as where the steering wheel 36 is operated with a large force in a state in which the steering lock device is activated or the like are separately and independently provided. The first tightening surfaces 22a are provided on the pair of clamp portions 20a for holding the inner column 8a, and therefore it is not necessary to transmit torque to the inner-side surfaces in the width direction of the pair of support plate portions 21a. Therefore, it is sufficient for the pair of clamp portions 20a to exert only the function of sandwiching the inner column 8a, and it is not necessary to maintain a strength more than what is necessary. Accordingly, it is possible to greatly bend the pair of clamp portions 20a in the width direction. On the other hand, the second tightening surfaces 28a and the third tightening surfaces 30a do not need to be greatly bent in the width direction, and bending is sufficient as long as those surfaces are able exert a function of transmitting torque. As a result, according to the steering device 1a of this example, it is possible to maintain both the strength of the outer column 9a and the holding force for holding the inner column 8a at the same time.

In this example, in a state in which the pair of clamp portions 20a are bent by the inner-side surfaces in the width direction of the pair of support plate portions 21a, the inner-side surfaces in the width direction of the pair of support plate portions 21a are brought in contact with the second tightening surfaces 28a and third tightening surfaces 30a having high rigidity in the width direction. Therefore, the support rigidity of the outer column 9a may be increased.

In a case of implementing the present invention, the shape, arrangement position and the like of the reinforcing rib provided in the reinforcing bridge portion are not limited to the shape and arrangement position of the reinforcing rib exemplified in an example of the embodiment of the present invention. As long as the function of the reinforcing rib may be exhibited, the shape of the reinforcing rib may be changed and the arrangement position thereof may be changed. Moreover, in one example of an embodiment of the present invention, the reinforcing rib is continuously arranged in a range from the lower surface of the bottom-plate portion to the front surface of the front-side connecting portions; however, it is also possible for the reinforcing rib to further be continuously arranged from the lower surface of the bottom plate portion to the rear surface of rear-side connecting portion. In this case, the reinforcing rib has a substantially U shape as viewed from the width direction. The number of reinforcing rib is not limited to one, and may be plural.

REFERENCE SIGNS LIST 1, 1a Steering device
2, 2a Steering shaft
3, 3a Steering column
4, 4a Lower bracket
5, 5a Upper bracket
6 Vehicle body
7, 7a Electric assist device
8, 8a Inner column
9, 9a Outer column
10, 10a Inner shaft
11, 11a Outer shaft
12, 12a Tilt shaft
13, 13a Sandwiched portion
14, 14a Tubular portion
15, 15a Column main body portion
16, 16a Reinforcing bridge portion
17, 17a Front-rear direction slit
18, 18a Front-side circumferential-direction slit
19, 19a Rear-side circumferential-direction slit
20, 20a Pair of clamp portions
21, 21a Pair of support plate portions
22, 22a First tightening surface
23, 23a Gap
24, 24a Bottom-plate portion
25, 25a Front-side connecting portion
26, 26a Rear-side connecting portion
27, 27a Elongated telescopic adjustment hole
28, 28a Second tightening surface
29, 29a Ridge portion
30, 30a Third tightening surface 31, 31a Mounting plate portion
32, 32a Elongated tilt adjustment hole
33, 33a Adjustment rod
34, 34a Adjustment lever
35, 35a Cam device
36 Steering wheel
37 Gear housing
39 Thin-walled portion
40a, 40b Thick-walled portion
41 Upper-side rib
42 Overhanging-plate portion
43 Lateral rib
44 Reinforcing rib
45 Front-side inclined portion
46 Front-wall portion
47 Rectangular hole
48 First rib
49 Second rib
50 Rectangular groove
51 Locking capsule
52 Bridge portion
53 Side plate portion
54 Bracket rib
55 Locking notch
56 Reinforcing ridge
57 Slit
58 Bent plate portion
59 Head portion
60 Male screw portion
61 Nut
62 Thrust bearing
63 Pressure plate
64 Drive-side cam
65 Driven-side cam
66 Drive-side cam surface
67 Driven-side cam surface
68 Convex engaging portion
69 Tension spring
70 Lock through hole

The invention claimed is:

1. An outer column arranged behind an inner column and having a front-side portion for externally fitting with a rear-side portion of the inner column to allow relative displacement in an axial direction thereof, and an elongated telescopic adjustment hole extending in a front-rear direction thereof;
the outer column comprising a column main body portion having a substantially cylindrical shape and arranged on the front-side portion, and a reinforcing bridge portion integrally arranged below the column main body portion;
the column main body portion having a pair of clamp portions arranged on both sides in the width direction, and capable of holding the inner column from both sides in the width direction by elastically deforming in the width direction;
the reinforcing bridge portion arranged so as to cover the pair of clamp portions via a substantially U-shaped gap as viewed from the width direction, and having a bottom-plate portion, a front-side connecting portion, and a rear-side connecting portion;
the bottom-plate portion extending in the front-rear direction and the width direction, and arranged below the pair of clamp portions via the elongated telescopic adjustment hole forming a lower side of the substantially U-shaped gap;
the front-side connecting portion comprising a front-side inclined portion that connects a front-end portion of the bottom-plate portion and a portion of a lower surface of the column main body portion that is arranged further on a front side than the pair of clamp portions, and is inclined in a direction toward the front side going toward an upper side; and
the rear-side connecting portion comprising a rear-side inclined portion that connects a rear-end portion of the bottom-plate portion and a portion of the lower surface of the column main body portion that is arranged further on a rear side than the pair of clamp portions, and is inclined in a direction toward the rear side going toward the upper side,
the outer column further comprising a reinforcing rib arranged so as to extend in the front-rear direction on a lower surface of the bottom-plate portion and be continuous in a range from the lower surface of the bottom-plate portion to a front surface of the front-side connecting portion,
wherein the reinforcing rib comprises a first rib extending in the front-rear direction on the lower surface of the bottom-plate portion and having a front-end portion that projects further toward the front side than the front-end portion of the bottom-plate portion, and a second rib extending toward the upper side from a front-end portion of the first rib and being continuous to the front surface of the front-side connecting portion.

2. The outer column according to claim 1 wherein the column main body portion has a front-rear direction slit extending in the front-rear direction on the lower surface of the column main body, and a front-side circumferential-direction slit and a rear-side circumferential-direction slit in a front-side portion and a rear-side portion of a lower-half portion of the column main body portion extending in a circumferential direction so as to respectively cross the front-rear direction slit; the pair of clamp portions is composed of portions on both sides in the width direction surrounded on three sides by the front-rear direction slit, the front-side circumferential-direction slit, and the rear-side circumferential-direction slit; and the front-end portion of the first rib covers a front-end portion of the front-rear direction slit from below.

3. A steering device comprising:
a steering column comprising an inner column, and an outer column arranged behind the inner column and having a front-side portion for externally fitting with a rear-side portion of the inner column to allow relative displacement in an axial direction thereof, and an elongated telescopic adjustment hole extending in a front-rear direction thereof;
a support bracket capable of being supported by a vehicle body and comprising a pair of support plate portions arranged on both sides in a width direction of the outer column and having bracket side through holes; and
an adjustment rod that is inserted in the width direction through the elongated telescopic adjustment hole and the bracket side through holes; wherein
the outer column is composed of the outer column according to claim 1.

* * * * *